United States Patent
Chen et al.

(10) Patent No.: US 8,385,268 B2
(45) Date of Patent: Feb. 26, 2013

(54) METHOD AND APPARATUS FOR EFFICIENT CONTROL DECODING FOR TRANSPARENT RELAYING OPERATION IN A WIRELESS COMMUNICATION SYSTEM

(75) Inventors: Wanshi Chen, San Diego, CA (US); Aamod Dinkar Khandekar, San Diego, CA (US); Juan Montojo, San Diego, CA (US); Alexei Gorokhov, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 414 days.

(21) Appl. No.: 12/730,640

(22) Filed: Mar. 24, 2010

(65) Prior Publication Data

US 2010/0246721 A1  Sep. 30, 2010

Related U.S. Application Data

(60) Provisional application No. 61/163,424, filed on Mar. 25, 2009.

(51) Int. Cl.
*H04W 4/00* (2009.01)
*H04J 3/08* (2006.01)
*G08C 25/02* (2006.01)

(52) U.S. Cl. ............... 370/328; 370/315; 714/748

(58) Field of Classification Search ............... None
See application file for complete search history.

(56) References Cited

U.S. PATENT DOCUMENTS

| | | | |
|---|---|---|---|
| 2008/0159323 A1 | 7/2008 | Rinne et al. | |
| 2011/0085458 A1* | 4/2011 | Montojo et al. | 370/252 |
| 2011/0103509 A1* | 5/2011 | Chen et al. | 375/295 |

FOREIGN PATENT DOCUMENTS

EP  1988667  11/2008

OTHER PUBLICATIONS

3GPP TSG-RAN WG1 #56bis, R1-091403, Title: Further consideration on L2 transparent relay, Source: Vodafone, Seoul, Korea, Mar. 23-27, 2009.
International Search Report and Written Opinion—PCT/US2010/028715, International Search Authority—European Patent Office—Aug. 24, 2010 (091768).
Motorola: 3GPP TSG RAN1#50 R1-073373 "Search Space Definition for L1/L2 Control Channels" 3GPP TSG RAN #50,[Online] vol. R1-073373, No. 50, Aug. 20, 2007, pp. 1-11, XP002512720 Retrieved from the Internet: URL:http://www.3gpp.org/ftp/tsgran/WG1_RL1/TSGR1_50/Docs/R1-073373.zip> [retrieved on Jan. 29, 2009] the whole document.

* cited by examiner

*Primary Examiner* — Clemence Han
(74) *Attorney, Agent, or Firm* — Milan Patel; Peter Clevenger

(57) ABSTRACT

Systems and methodologies are described herein that facilitate efficient control decoding to facilitate management of cooperative relay operation in a wireless communication environment. As described herein, a relay node (RN) and/or another entity cooperating with a serving network node for respective users in a potentially assisted group can prune a search space of control decoding candidates corresponding to the respective users. For example, respective control decoding candidates corresponding to, e.g., common and/or user-specific search spaces, aggregation levels, control channel sizes, etc., can be eliminated from a reduced control search space based on various criteria. Further, sets of control decoding candidates corresponding to respective users not schedulable at a given time interval can be eliminated. In addition, control search space pruning can be performed in addition to or in place of increased cyclic redundancy check (CRC) protection for control information, thereby further decreasing the probability of false control detection.

50 Claims, 14 Drawing Sheets

METHOD AND APPARATUS FOR EFFICIENT CONTROL DECODING FOR TRANSPARENT RELAYING OPERATION IN A WIRELESS COMMUNICATION SYSTEM

CROSS-REFERENCE

This application claims the benefit of U.S. Provisional Application Ser. No. 61/163,424, filed Mar. 25, 2009, and entitled "A METHOD AND APPARATUS FOR EFFICIENT PDCCH DECODING FOR TRANSPARENT RELAYING OPERATION IN A WIRELESS COMMUNICATION SYSTEM," the entirety of which is incorporated herein by reference.

BACKGROUND

I. Field

The present disclosure relates generally to wireless communications, and more specifically to techniques for managing cooperative relay operation in a wireless communication environment.

II. Background

Wireless communication systems are widely deployed to provide various communication services; for instance, voice, video, packet data, broadcast, and messaging services can be provided via such wireless communication systems. These systems can be multiple-access systems that are capable of supporting communication for multiple terminals by sharing available system resources. Examples of such multiple-access systems include Code Division Multiple Access (CDMA) systems, Time Division Multiple Access (TDMA) systems, Frequency Division Multiple Access (FDMA) systems, and Orthogonal Frequency Division Multiple Access (OFDMA) systems.

Generally, a wireless multiple-access communication system can simultaneously support communication for multiple wireless terminals. In such a system, each terminal can communicate with one or more base stations via transmissions on the forward and reverse links. The forward link (or downlink) refers to the communication link from the base stations to the terminals, and the reverse link (or uplink) refers to the communication link from the terminals to the base stations. This communication link can be established via a single-in-single-out (SISO), multiple-in-signal-out (MISO), or a multiple-in-multiple-out (MIMO) system.

In various wireless communication systems, relay nodes and/or other suitable network nodes can be utilized to enhance communication between an Evolved Node B (eNB) and respective user equipment units (UEs) served by the eNB. For example, in the case of Hybrid Automatic Repeat Request (HARM) transmission and/or another suitable repeat transmission scheme, a relay node can detect communication between an eNB and UE and assist on re-transmissions to the UE as required.

In order for a relay node to provide assistance in the above manner, the relay node can be configured to monitor and decode control information exchanged between an associated eNB and a designated set of UEs associated with the eNB that the relay node can potentially assist. Conventionally, respective UEs that can be potentially assisted with a relay node are associated with control decoding search spaces, which are processed by the relay node to determine control resources to monitor and/or utilize for a given UE or set of UEs. However, as the overall search space associated with the set of UEs that can be potentially assisted by the relay node increases, an associated relay node can experience an increase in required complexity and/or a decrease in overall performance (e.g., due to an increased probability of false decodes). Accordingly, it would be desirable to implement techniques for control decoding for cooperative relay operation in a wireless communication system that yield lower complexity and/or enhanced performance.

SUMMARY

The following presents a simplified summary of various aspects of the claimed subject matter in order to provide a basic understanding of such aspects. This summary is not an extensive overview of all contemplated aspects, and is intended to neither identify key or critical elements nor delineate the scope of such aspects. Its sole purpose is to present some concepts of the disclosed aspects in a simplified form as a prelude to the more detailed description that is presented later.

According to an aspect, a method is described herein. The method can comprise identifying a set of associated user equipment units (UEs) and respective sets of control decoding candidates corresponding to respective UEs in the set of associated UEs; and generating a reduced subset of control decoding candidates corresponding to the set of associated UEs at least in part by performing one or more of omitting sets of control decoding candidates from the reduced subset of control decoding candidates that are associated with at least one UE in the set of associated UEs that is not schedulable at a given time interval or omitting at least one control decoding candidate from respective sets of control decoding candidates for at least one UE in the set of associated UEs from the reduced subset of control decoding candidates.

A second aspect described herein relates to a wireless communications apparatus, which can comprise a memory that stores data relating to a set of associated UEs and respective sets of control decoding candidates corresponding to respective UEs in the set of associated UEs. The wireless communications apparatus can further comprise a processor configured to generate a reduced subset of control decoding candidates corresponding to the set of associated UEs at least in part by performing one or more of omitting sets of control decoding candidates from the reduced subset of control decoding candidates that are associated with at least one UE in the set of associated UEs that is not schedulable at a given time interval or omitting at least one control decoding candidate from respective sets of control decoding candidates for at least one UE in the set of associated UEs from the reduced subset of control decoding candidates.

A third aspect relates to an apparatus, which can comprise means for identifying sets of control decoding candidates associated with respective UEs in a potentially assisted group and means for generating a reduced subset of control decoding candidates at least in part by eliminating one or more control decoding candidates from at least one set of control decoding candidates or by eliminating sets of control decoding candidates corresponding to at least one UE in the potentially assisted group.

A fourth aspect described herein relates to a computer program product, which can include a computer-readable medium that comprises code for causing a computer to identify sets of control decoding candidates associated with respective UEs in a potentially assisted group and code for causing a computer to generate a reduced subset of control decoding candidates at least in part by eliminating one or more control decoding candidates from at least one set of control decoding candidates or by eliminating sets of control decoding candidates corresponding to at least one UE in the potentially assisted group.

To the accomplishment of the foregoing and related ends, one or more aspects of the claimed subject matter comprise the features hereinafter fully described and particularly pointed out in the claims. The following description and the annexed drawings set forth in detail certain illustrative aspects of the claimed subject matter. These aspects are indicative, however, of but a few of the various ways in which the principles of the claimed subject matter can be employed. Further, the disclosed aspects are intended to include all such aspects and their equivalents.

DETAILED DESCRIPTION

Figure 1:
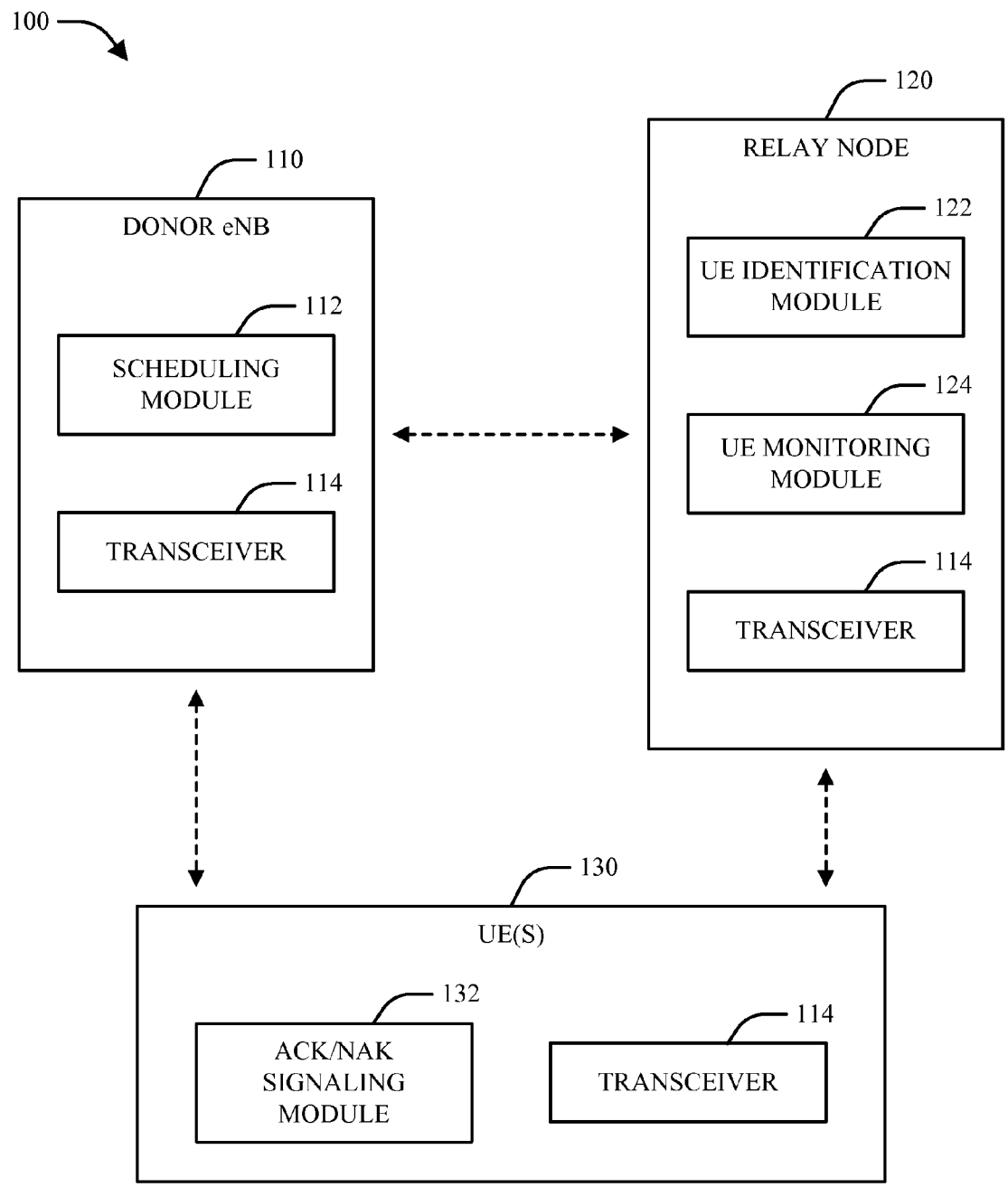
FIG. 1 is a block diagram of a system that facilitates cooperative relay operation within a wireless communication environment in accordance with various aspects.

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment (UE). A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point or Node B) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various functions described herein can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Various techniques described herein can be used for various wireless communication systems, such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Single Carrier FDMA (SC-FDMA) systems, and other such systems. The terms "system" and "network" are often used herein interchangeably. A CDMA system can implement a radio technology such as Universal Terrestrial Radio Access (UTRA), CDMA2000, etc. UTRA includes Wideband-CDMA (W-CDMA) and other variants of CDMA. Additionally, CDMA2000 covers the IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Further, CDMA2000 and UMB are described in documents from an organization named "3rd Generation Partnership Project 2" (3GPP2).

Various aspects will be presented in terms of systems that can include a number of devices, components, modules, and the like. It is to be understood and appreciated that the various systems can include additional devices, components, modules, etc. and/or omit some or all of the devices, components, modules etc. discussed in connection with the figures. A combination of these approaches can also be used.

Referring now to the drawings, FIG. 1 illustrates a system 100 that facilitates cooperative relay operation within a wireless communication environment in accordance with various aspects described herein. As FIG. 1 illustrates, system 100 can include one or more network nodes (also referred to herein as Node Bs or eNBs, cells or network cells, base stations, access points (APs), etc.). Network nodes in system 100 can include, for example, a network node that provides communication service to one or more UEs 130, referred to herein as a donor eNB (DeNB) 110. Additionally, network nodes in system 100 can include one or more relay nodes (RNs) 120, which can assist in facilitating communication between DeNB 110 and one or more UEs 130. As used herein, a UE can also be referred to as an access terminal (AT), mobile terminal, user or mobile station, etc.

In accordance with one aspect, UE 130 can engage in one or more uplink (UL, also referred to herein as reverse link (RL)) communications with DeNB 110 and/or RN 120, and similarly DeNB 110 and/or RN 120 can engage in one or more downlink (DL, also referred to herein as forward link (FL)) communications to UE 130. Additionally or alternatively, DeNB 110, RN 120, and/or UE 130 can engage in any suitable communication(s) with each other, with other devices or entities in system 100, and/or any other suitable entities. For example, a backhaul link and/or other means can be provided between DeNB 110 and RN 120 (e.g., directly or indirectly through a central network entity (not shown)) to facilitate communication therebetween. As shown in system 100, DeNB 110, RN 120, and/or a UE 130 can utilize respective transceivers 114 and/or any other suitable means for communication within system 100.

In accordance with one aspect, RN 120 can include some or all of the functionality of an eNB in system 100, such as DeNB 110 or the like. Alternatively, RN 120 can be a specialized network node dedicated to assisting in communication between a DeNB 110 and related UEs 130. For example, RN 120 can facilitate Layer 2 (L2) transparent relay (also referred to in the art as type 2 relay, etc.), wherein RN 120 operates to relay information from DeNB 110 to one or more UEs 130 in a transparent manner to said UEs 130. Thus, in one example, RN 120 can communicate to a UE 130 without providing physical signals to the UE 130 that identify RN 120. Accordingly, a UE 130 can receive signals from both DeNB 110 and RN 120 without requiring knowledge of the existence of RN 120, thereby resulting in improved quality of received signals at the UE 130 independently of the source(s) of the received signals.

While the above description relates to a fully transparent RN 120, it can be appreciated that RN 120 can alternatively operate in a fully or partially non-transparent manner to UEs 130. For example, RN 120 can make its presence known to UE 130 in order to facilitate channel quality reporting at UE 130 corresponding to a channel between UE 130 and RN 120.

In one example, irrespective of an extent to which RN 120 is transparent to a UE 130, communication within system 100 can be configured such that control information associated with a UE 130 is provided to the UE 130 by DeNB 110. Additionally or alternatively, system 100 can be configured such that some or all communication to a UE 130 is originated by DeNB 110. Subsequently, RN 120 can assist in respective re-transmissions of information as necessary.

By way of example, DeNB 110 can include a scheduling module 112 that performs initial scheduling for one or more UEs 130. Scheduling information for UEs 130 generated by scheduling module 112, and/or other suitable control information, can be provided to UEs 130 (e.g., via transceiver 114) and/or to RN 120 (e.g., via a backhaul link between DeNB 110 and RN 120). Based on scheduling information provided to RN 120 by DeNB 110, RN 120 can utilize a UE identification module 122 and/or other suitable means to determine a group of UEs 130 that could potentially require the assistance of RN 120. Various examples of techniques that can be utilized by UE identification module 122 to make such a determination are described in further detail herein. RN 120 can then utilize a UE monitoring module 124 and/or other mechanisms to monitor communication between DeNB 110 and respective UEs 130 determined by UE identification module 122 as potentially requiring assistance of RN 120. For example, UE monitoring module 124 can attempt to detect acknowledgement (ACK) or negative acknowledgement (NAK) signaling provided by one or more UEs 130 via respective ACK/NAK signaling modules 132 at the respective UEs 130 in response to DL communications from DeNB 110 to the UEs 130. If UE monitoring module 124 detects a NAK and/or otherwise determines that a given UE 130 is experiencing difficulty in receiving information from DeNB 110, RN 120 can assist in re-transmissions of the information to UE 130.

Accordingly, in one example, RN 120 can be transparent to UEs 130 and assist DL transmissions to UEs 130 and/or UL transmissions to DeNB 110 in a Hybrid Automatic Repeat Request (HARQ) synchronous manner for coherent combining at the receiver. For example, RN 120 can monitor a signaling exchange between DeNB 110 and UEs 130 and attempt to decode HARQ transmissions at given time intervals (e.g., corresponding to subframes, HARQ process identifiers (IDs), etc.), based on which RN 120 can assist via contribution to subsequent re-transmissions as generally described herein. In one example, HARQ re-transmissions at RN 120 can be configured to be performed in cooperation with, and/or in place of, DL re-transmissions from DeNB 110 or UL re-transmissions from UEs 130. In another example, a transparent RN 120 can refrain from transmitting a common reference signal (CRS) and can instead rely on a dedicated reference signal (DRS) for the purpose of coherent detection.

In accordance with one aspect, UEs 130 that can be potentially assisted by RN 120 are identified a priori by DeNB 110. For example, scheduling of potentially assisted UEs 130 can be predetermined by DeNB 110 (e.g., via scheduling module 112 at DeNB 110) with respect to subframes, redundancy versions, re-transmission details, or the like, and broadcasted to RN 120 prior to transmission to said UEs 130. In addition, DeNB 110, via scheduling module 112 and/or other suitable means, can provide RN 120 with information relating to pre-scheduling for UL and/or DL HARQ re-transmissions and/or any other suitable information prior to a signaling exchange between DeNB 110 and UEs 130.

In accordance with another aspect, based on a set of UEs 130 that can be potentially assisted by RN 120, a UE identification module 122 and/or other suitable means at RN 120 can be utilized to identify UEs 130 that require the assistance of RN 120. In one example, this can be achieved by first identifying the UEs 130 in the potentially assisted group that are being newly scheduled by DeNB 110. This can be done by, for example, monitoring the Physical Downlink Control Channel (PDCCH) control space and/or another suitable control space. For example, RN 120 can intercept control information from DeNB 110 to UEs 130 in the potentially assisted group in which DeNB 110 schedules a subset of the UEs 130 at a given point in time. Subsequently, RN 120 can decode DL control signaling exchanged between DeNB 110 and the scheduled UEs 130 and then attempt to intercept UL ACK/NAK transmissions from the UEs 130 (e.g., via a UE monitoring module 124) to determine whether to begin assisting with transmission to the UEs 130.

Additionally or alternatively, RN 120 can assist one or more UEs 130 in conducting UL transmissions to DeNB 110. For example, RN 120 can intercept PDCCH and/or other control information from DeNB 110 that includes scheduling information for Physical Uplink Shared Channel (PUSCH) and/or other UL transmissions from respective UEs 130 to DeNB 110. Based on such scheduling, RN 120 can monitor DL ACK/NAK transmissions provided by DeNB 110 in response to UL transmissions provided by UE(s) 130 in order to determine whether to assist the UE(s) 130 in transmitting on the UL to DeNB 110.

In one example, RN 120 can intercept control information exchanged between DeNB 110 and UEs 130 based on a control decoding candidate set or control search space associated with system 100. By way of specific, non-limiting example, this control decoding candidate set can correspond to PDCCH blind decodes. However, it should be appreciated that the various aspects described herein are applicable generally to any suitable type of control signaling. For example, various aspects described herein can be applied to control signaling associated with backhaul communication for non-transparent relay (e.g., type-1 relay, etc.) utilizing a bandwidth region allocated for data (e.g., a Relay Packet Data Control Channel or R-PDCCH). Additionally or alternatively, various aspects described herein can be extended for heterogeneous networks to facilitate improved interference protection.

Referring again to the non-limiting example of PDCCH blind decodes, a UE can be configured to perform blind decoding on PDCCH for a PDCCH search space of a given size. In one specific illustrative example, a UE can perform up to 44 blind decodes, which can correspond to 22 PDCCH locations over a variety of aggregation levels and starting points for each of two distinct PDCCH sizes (e.g., size 1 and size 2). Accordingly, it can be appreciated that a UE can be associated with a control decoding candidate set or search space containing a predetermined number of elements. As a result, if RN 120 is required to involve itself in decoding for multiple UEs, it can be appreciated that the combined size of each control decoding search space analyzed by RN 120 can become significantly large. For example, in the above example of 44 blind decodes per UE, a RN 120 that can potentially assist up to 10 UEs could be required to analyze up to 440 blind decodes. In the event that RN 120 is required to analyze a large combined search space in this manner, it can be appreciated that the required complexity of RN 120 can increase.

Further, it can be appreciated that the performance of RN 120 and system 100 as a whole can decrease as the combined search space size increases due to increased false alarm probability. For example, for each control signaling element in the combined search space, cyclic redundancy check (CRC) protection and/or other error prevention means can be provided that uniquely identifies the UE that the given control signaling element corresponds to. However, it can be appreciated that false alarms and/or other error events can occur even with CRC protection and/or mechanisms. For example, RN 120 may falsely detect DL scheduling from DeNB 110 to a given UE 130, based on which RN 120 will try to get involved in a nonexistent signaling exchange. As no ACK/NAK signaling is transmitted by the UE 130 in such a case, RN 120 in some cases may attempt excessive re-transmissions of the nonexistent signaling exchange (e.g., due to regarding a lack of ACK/NAK signaling by the UE 130 as a NAK by default), which can result in increased interference to devices within range of RN 120.

In a typical example, a control signaling element utilizes a 16-bit CRC field, which corresponds to a false alarm probability of approximately $10^{-5}$. However, it can be appreciated that as the number of blind decodes analyzed by RN 120 increases, the overall false alarm probability will increase proportionally. Thus, in some cases where the number of blind decodes associated with RN 120 is sufficiently large, the false alarm probability associated with RN 120 can increase to levels deemed unacceptable by an operator of system 100.

Figure 2:
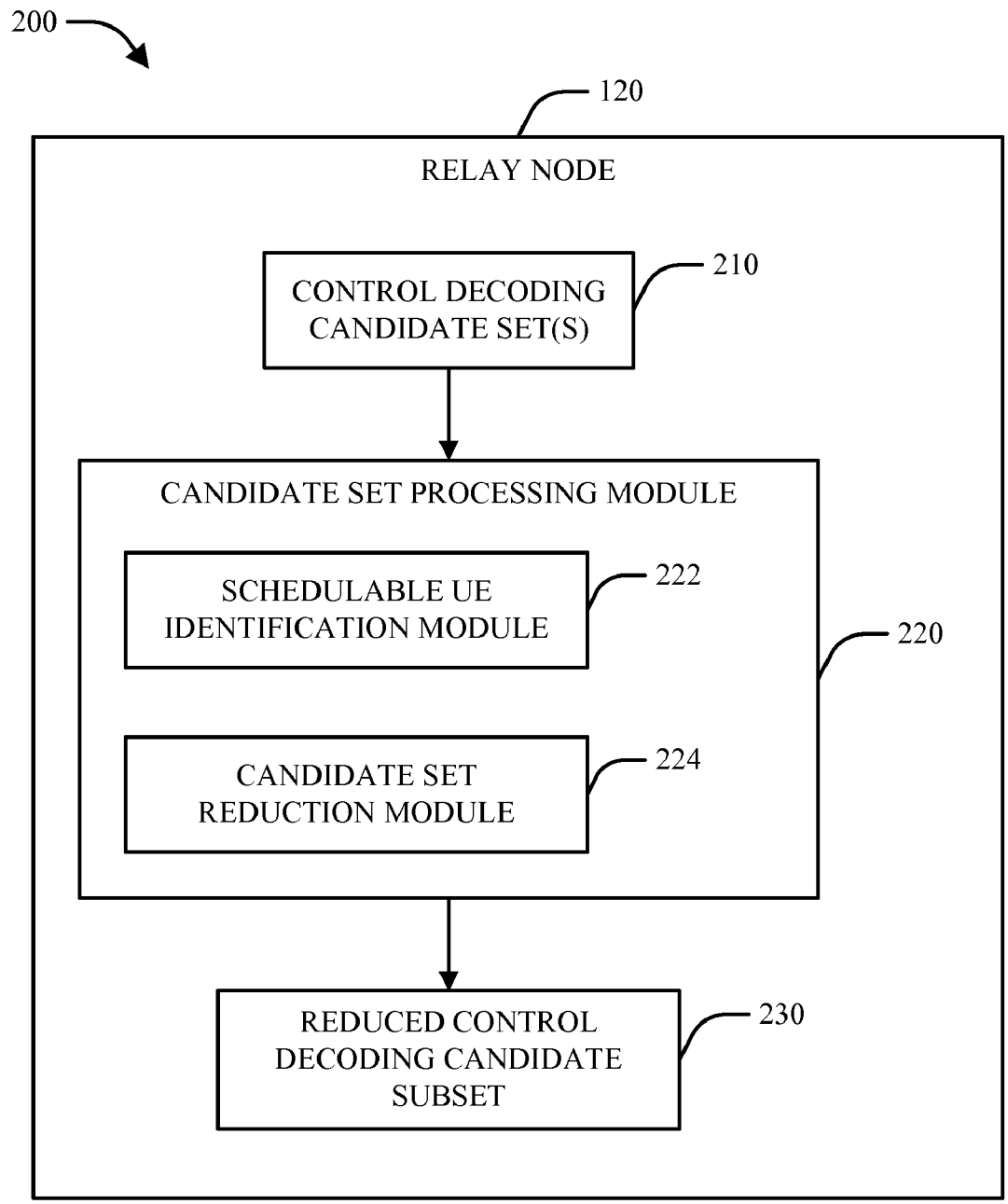
FIG. 2 is a block diagram of a system for efficient control decoding in association with relaying operation for a wireless communication system in accordance with various aspects.

Accordingly, in order to reduce the impact of false alarms detected by RN 120, RN 120 can perform various techniques to reduce the overall amount of control decoding candidates it analyzes at a given point in time. An example configuration that can be employed by RN 120 to the furtherance of these ends is illustrated by system 200 in FIG. 2. As system 200 illustrates, RN 120 can be associated with one or more control decoding candidate sets 210, which can correspond to respective PDCCH blind decodes and/or any other suitable control search space(s). In one example, control decoding candidate set(s) 210 can be obtained by RN 120 by identifying a set of associated UEs (e.g., UEs 130) and respective sets of control decoding candidates corresponding to respective UEs in the set of associated UEs. Subsequently, RN 120 can utilize a candidate set processing module 220 and/or other suitable means to generate a reduced control decoding candidate subset 230 that corresponds to the set of associated UEs.

As shown by system 200, candidate set processing module 220 can create a reduced control decoding candidate subset 230 at least in part by omitting sets of control decoding candidates from reduced control decoding candidate subset 230 that are associated with at least one UE in the set of associated UEs that is not schedulable at a given time interval (e.g., using a schedulable UE identification module 222 and/or other suitable means), omitting at least one control decoding candidate provided in respective control decoding candidate sets 210 that correspond to at least one UE in the set of associated UEs from reduced control decoding candidate subset 230 (e.g., via a candidate set reduction module 224 and/or other means), and/or in any other suitable manner. In one example, upon generating a reduced control decoding candidate subset 230, RN 120 can determine at least one UE to assist (e.g., a newly scheduled UE, etc.) from a set of associated UEs based at least in part on the reduced control decoding candidate subset 230.

Thus, in general, it can be appreciated that candidate set processing module 220 can operate to reduce the number of blind decodes and/or other decoding candidates that are utilized by RN 120 in identifying UEs and/or other network entities to assist. Various techniques that can be utilized by candidate set processing module 220, as well as the modules 222-224 provided therein, are provided in further detail herein. Additionally or alternatively, while not shown in system 200, false alarm probability associated with RN 120 can be reduced by increasing the size of a CRC field by, for example, redesigning CRC length and/or increasing CRC size in a virtual manner (e.g., using virtual CRC) by setting respective payload bits to a predefined deterministic value and/or by any other suitable means. Additionally or alternatively, the size of a CRC field can be increased, and/or any other suitable protection mechanisms associated with respective elements of control decoding candidate set(s) 210 can be implemented. For example, DL and UL PDCCH grants can be separated in different subframes for reduced complexitiy and reduced false alarm probability. Accordingly, by way of specific, non-limiting example, respective elements in control decoding candidate set(s) 210 can correspond to PDCCH blind decodes that are associated with an extended CRC field (e.g., a CRC field of greater than 16 bits). By way of additional specific, non-limiting example, respective elements in control decoding candidate set(s) 210 can be identified that correspond to candidate resources for PDCCH grants, wherein the respective control decoding candidates corresponding to candidate resources for PDCCH grants are configured such that PDCCH grants including downlink PDCCH grants and uplink PDCCH grants are provided at different subframes via time division multiplexing.

As stated above, candidate set processing module 220 can be used in accordance with various aspects to reduce the number of blind decodes and/or other elements associated with control decoding candidate set(s) 210 at RN 120. As an illustration, a specific example is provided for a 20 MHz system bandwidth, 3 OFDM control symbols, 2 transmit antennas, and Physical HARQ Indicator Channel (PHICH) resource size Ng=1, which results in a total number of 84 control channel elements (CCEs). Based on such a resource configuration, RN 120 can choose to implement the subframe-dependent and UE-specific search space for each associated UE and/or choose to monitor all valid CCE aggregation levels over the entire control space. While the former provides a reduced number of PDCCH decoding candidates, it can be appreciated that it involves additional implementation complexity as well.

More specifically, use of the explicit UE-specific search space results in 4+2+16N decoding candidates, where N is the number of UEs, the value of 4 corresponds to the number of decoding candidates for aggregation level 4 in the common search space, the value of 2 corresponds to the number of decoding candidates for aggregation level 8 in the common search space, and the value of 16 corresponds to the maximum number of decoding candidates in the UE-specific space (e.g., 16=6 (level 1)+6 (level 2)+2 (level 4)+2 (level 8)). Alternatively, use of the entire search space results in 84+floor (84/2)+floor (84/4)+floor (84/8)=157 decoding candidates, in observation of four possible aggregation levels and the fact that a given aggregation level L will always start with the CCE index of integer multiples of L.

Based on the above, it can be appreciated that use of the UE-specific search space involves complexity that linearly increases with the number of UEs in the potentially assisted group. Thus, as discussed above, when the number of UEs is substantially large, the number of decoding candidates can become unfavorably large. Alternatively, while use of the entire search space has a fixed number of decoding candidates, it can be appreciated that the number of decoding candidates is approximately 7 times that of a single UE-specific search space.

Accordingly, to mitigate complexity and/or performance issues associated with substantially large control decoding candidate set(s) 210, RN 120 can utilize candidate set reduction module 224 to reduce the size of control decoding candidate set(s) 210 on a per-UE basis, utilize schedulable UE identification module 222 to reduce the number of UEs that are monitored by RN 120 at a given point in time, or the like. Example implementations that can be utilized with respect to candidate set reduction module 224 and schedulable UE identification module 222 are provided in further detail herein at FIG. 3 and FIG. 4, respectively. In one example, operation of candidate set processing module 220 and/or one or more modules 222-224 therein can be dependent on system loading, channel quality associated with respective UEs and/or an eNB corresponding to the respective UEs, and/or other factors. In another example, RN 120 can synchronize with an associated DeNB by, for example, exchanging information relating to control decoding candidate set(s) 210 and/or UEs associated therewith and/or performing other suitable actions to facilitate the various operations of RN 120 described herein.

Figure 3:
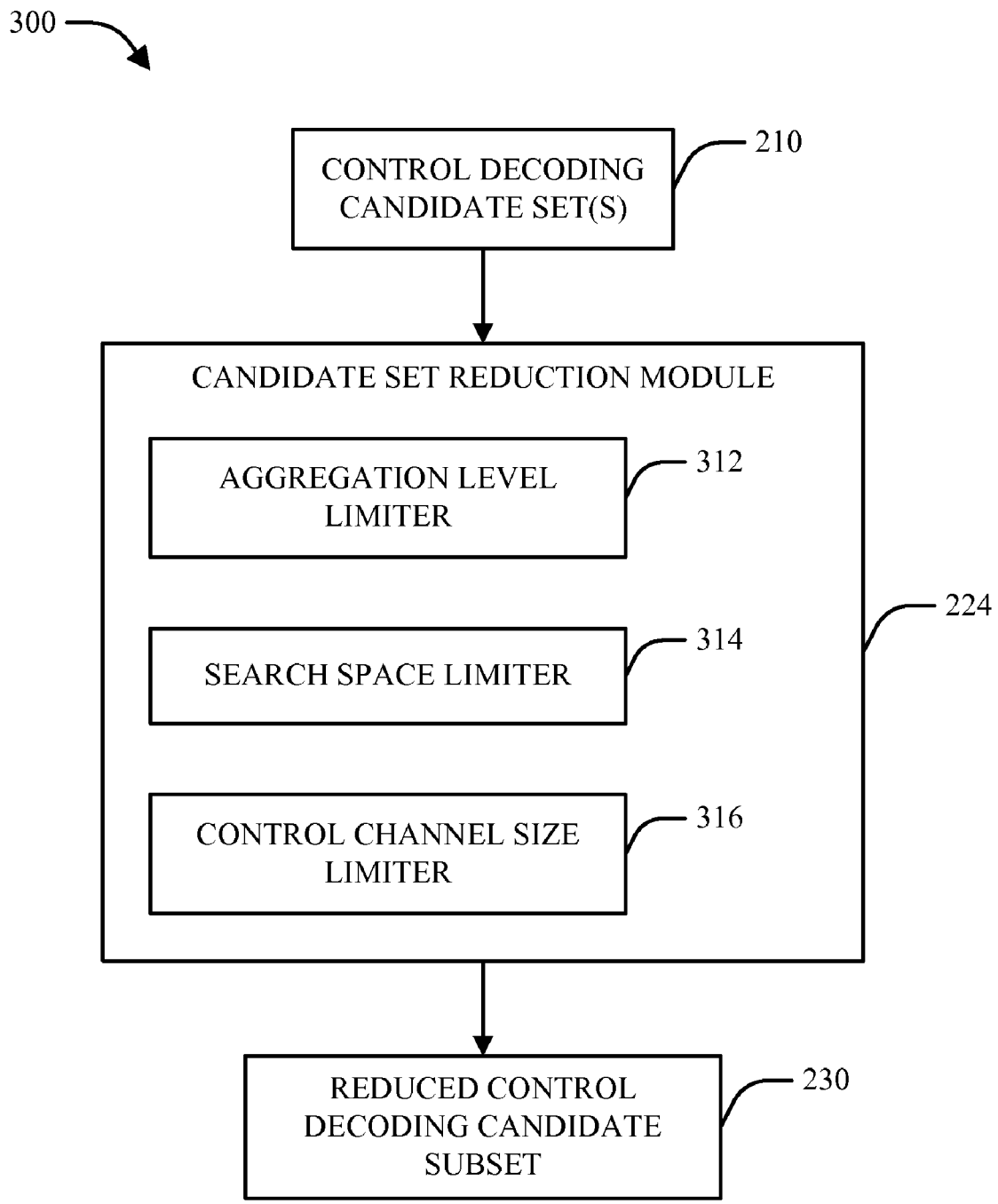
FIG. 3 is a block diagram of a system for control search space processing in association with relaying operation for a wireless communication system in accordance with various aspects.

With reference next to FIG. 3, a block diagram of a system 300 for control search space processing in association with relaying operation for a wireless communication system is provided, which illustrates operation of candidate set reduction module 224 in further detail. In a similar manner to system 200, system 300 can utilize one or more control decoding candidate sets 210, which can be processed by candidate set reduction module 224 and/or one or more other suitable modules to generate a reduced control decoding candidate subset 230.

In accordance with one aspect, candidate set reduction module 224 can limit the number of decoding candidates in control decoding candidate set(s) 210 per UE by, for example, limiting PDCCH and/or other control aggregation levels for an associated RN to decode, by limiting PDCCH and/or other control search space to either a common search space only or a UE-specific search space only, limiting control decoding candidate set(s) to a single PDCCH size and/or other control channel size, and/or by other means.

Thus, in a first example, candidate set reduction module 224 can include an aggregation level limiter 312 that can identify one or more aggregation levels associated with respective sets of control decoding candidates corresponding to a set of associated UEs and facilitate generation of reduced control decoding candidate subset 230 at least in part by limiting respective control decoding candidate sets 210 for at least one UE in the set of associated UEs to control decoding candidates associated with one or more selected aggregation levels. In a second example, candidate set reduction module 224 can include a search space limiter 314 that can identify a common search space and respective UE-specific search spaces associated with respective UEs in a set of associated UEs and facilitate generation of reduced control decoding candidate subset 230 at least in part by limiting respective control decoding candidate sets 210 for at least one UE in the set of associated UEs to control decoding candidates associated with the common search space or respective UE-specific search spaces for the at least one UE in the set of associated UEs. In a third example, candidate set reduction module 224 can include a control channel size limiter 316 that can identifying one or more control channel sizes (e.g., PDCCH sizes) associated with the respective control decoding candidate sets 210 and facilitate generation of reduced control decoding candidate subset 230 at least in part by limiting respective control decoding candidate sets 210 for at least one UE in a set of associated UEs to control decoding candidates associated with a one or more selected control channel sizes.

In accordance with one aspect, respective aggregation levels can be utilized within system 300 to provide varying levels of protection for control transmissions. For example, varying aggregation levels (e.g., level 1, level 2, level 4, level 8, etc.) can be utilized, which can correspond to varying levels of signal protection with respect to coding rate or the like. In one example, higher aggregation levels can utilize lower coding rates and/or other protective measures to enable high-quality signaling over a larger distance than that of lower aggregation levels.

Further, it can be appreciated that a UE that requires relay-assisted transmission is generally in a bad channel condition from the macro cell perspective. Accordingly, in order to deliver PDCCH and/or other control signaling more reliably and efficiently, larger aggregation levels (e.g., lower coding rates, etc.) are needed. For example, if aggregation levels 1, 2, 4, and 8 are supported, only aggregation levels 4 and 8 can be used for UEs experiencing poor channel conditions. Accordingly, aggregation level limiter 312 can be configured to eliminate elements of control decoding candidate set(s) 210 corresponding to lower aggregation levels, e.g., due to the fact that the channel quality experienced by a corresponding UE is likely poor if an associated RN is needed to assist in transmission. In one example, using the PDCCH search space described above and assuming only level 4 and level 8 are supported by aggregation level limiter 312, it can be appreciated that the number of decoding candidates in reduced control decoding candidate subset 230 can be reduced to 4+2+(2+2)N=6+4N, where N is the number of UEs in the potentially assisted group.

Additionally or alternatively, search space limiter 314 can limit search spaces associated with control decoding candidate set(s) 210 by the common search space only or by the UE-specific search space only. In one example, if search space limiter 314 utilizes only the common search space, it can be appreciated that an associated RN can be configured to abstain from UE-specific PDCCH search space computation. Indeed, in such a case it can be appreciated that the number of decoding candidates in reduced control decoding candidate subset is fixed at 4+2=6, independent of the number of UEs in the potentially assisted group. In another example, operation of search space limiter 314 can be based on various factors such as, e.g., system loading. For example, search space limiter 314 can identify a level of system loading associated with a set of associated UEs and selectively include or omit control decoding candidates associated with the common search space from reduced control decoding candidate subset 230 in response to the identified level of system loading.

In accordance with one aspect, aggregation level limiter 312, search space limiter 314, and control channel size limiter 316 can act independently or in combination to facilitate generation of reduced control decoding candidate subset 230. For example, aggregation level limiter 312 and search space limiter 314 can be utilized in combination to restrict elements of reduced control decoding candidate subset 230 to one or more selected aggregation levels in one or more selected search spaces. By way of specific example, aggregation level limiter 312 and search space limiter 314 can restrict reduced control decoding candidate subset 230 to aggregation levels 4 and 8 in both the common and UE-specific search spaces, resulting in 2[(4+2)+(2+2)]=2(10)=20 blind decodes, where (4+2) is the number of supported blind decodes in the common search space, (2+2) is the number of supported blind decodes in the UE-specific search space, and the factor of 2 represents the two PDCCH sizes. Additionally or alternatively, it can be appreciated that control channel size limiter 316 could be utilized to further limit the above set of blind decodes by, for example, limiting the restricted search space to a single PDCCH size.

Figure 4:
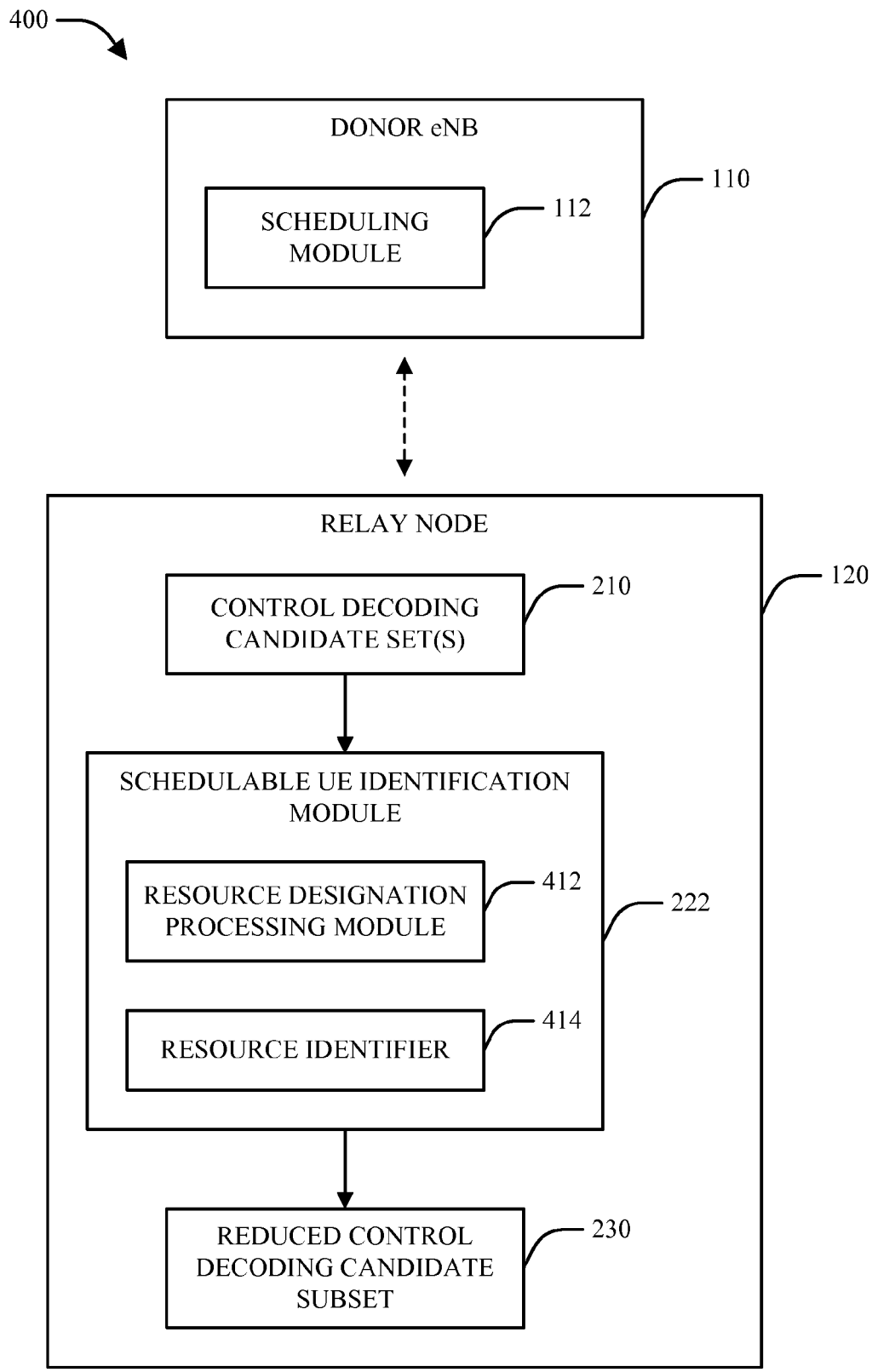
FIG. 4 is a block diagram of a system for user scheduling analysis in association with relaying operation for a wireless communication system in accordance with various aspects.

Turning next to FIG. 4, a block diagram of a system 400 for user scheduling analysis in association with relaying operation for a wireless communication system is provided, which illustrates operation of schedulable UE identification module 222 in further detail. In a similar manner to system 100, system 400 can include a DeNB 110 and RN 120 that can cooperate to communicate with one or more associated UEs. Further, in a similar manner to systems 200 and 300, RN 120 can utilize one or more control decoding candidate sets 210, which can be processed by schedulable UE identification module 222 and/or one or more other suitable modules to generate a reduced control decoding candidate subset 230.

As system 400 illustrates, schedulable UE identification module 222 can operate by obtaining information relating to timing designations corresponding to respective UEs in a set of associated UEs (e.g., designated subframes for respective UEs in the set of associated UEs, designated HARQ process IDs for respective UEs in the set of associated UEs, etc.) and facilitating generation of reduced control decoding candidate subset 230 at least in part by omitting sets of control decoding candidates from reduced control decoding candidate subset 230 that are associated with at least one UE in the set of associated UEs that is not schedulable at a given time interval as determined based on the timing designations. In one example, RN 120 can receive signaling relating to timing designations corresponding to respective UEs in the set of associated UEs from a DeNB 110 that is associated with the respective UEs (e.g., via scheduling module 112).

In accordance with one aspect, schedulable UE identification module 222 can reduce the number of PDCCH blind decodes and/or other control decoding candidates by performing UE grouping at a given point in time such that, at the given point in time, only a fraction of all UEs associated with RN can potentially be scheduled. By way of specific, non-limiting example, the potentially assisted UE group for RN 120 can include 5 UEs, indexed as UE0, UE1, UE2, UE3, and UE4. For such UEs, DeNB 110 can inform RN 120 that for each HARQ process ID, there is at most one UE in the group that can be potentially newly scheduled, e.g., {UEx} for HARQ process x, x={0, 1, 2, 3, 4}; {UE0} for HARQ process 5; {UE1} for HARQ process 6; {UE2} for HARQ process 7;

and so on, assuming a TDM structure of 8 HARQ process IDs. Alternatively, more than one UE can be allowed per HARQ process ID, e.g., {UE0, UE3} for H-ARQ process 0, etc.

In one example, a resource designation processing module 412 and/or other mechanisms at schedulable UE identification module 222 can identify and process such mappings and a resource identifier 414 and/or other means can identify a presently associated resource (e.g., a present subframe and/or corresponding HARQ ID) in order to reduce blind decodes and/or other control candidates to only UEs that are schedulable at the identified time resources. For example, in the case of resource designations corresponding to HARQ process IDs, schedulable UE identification module 222 can identify at least one UE in a set of associated UEs that is not schedulable at a given time interval at least in part by comparing HARQ process IDs corresponding to respective UEs in the set of associated UEs to a HARQ process ID corresponding to the given time interval.

Returning to FIG. 2, it can be appreciated that candidate set processing module 220 can utilize schedulable UE identification module 222 and candidate set reduction module 224 independently or in cooperation to generate reduced control decoding candidate subset 230. For example, schedulable UE identification module 222 can be utilized to initially limit control decoding candidates to a set of presently schedulable UEs, and subsequently candidate set reduction module can be utilized to limit the remaining candidates to specified aggregation levels, search spaces, control channel sizes, or the like.

Figure 5:
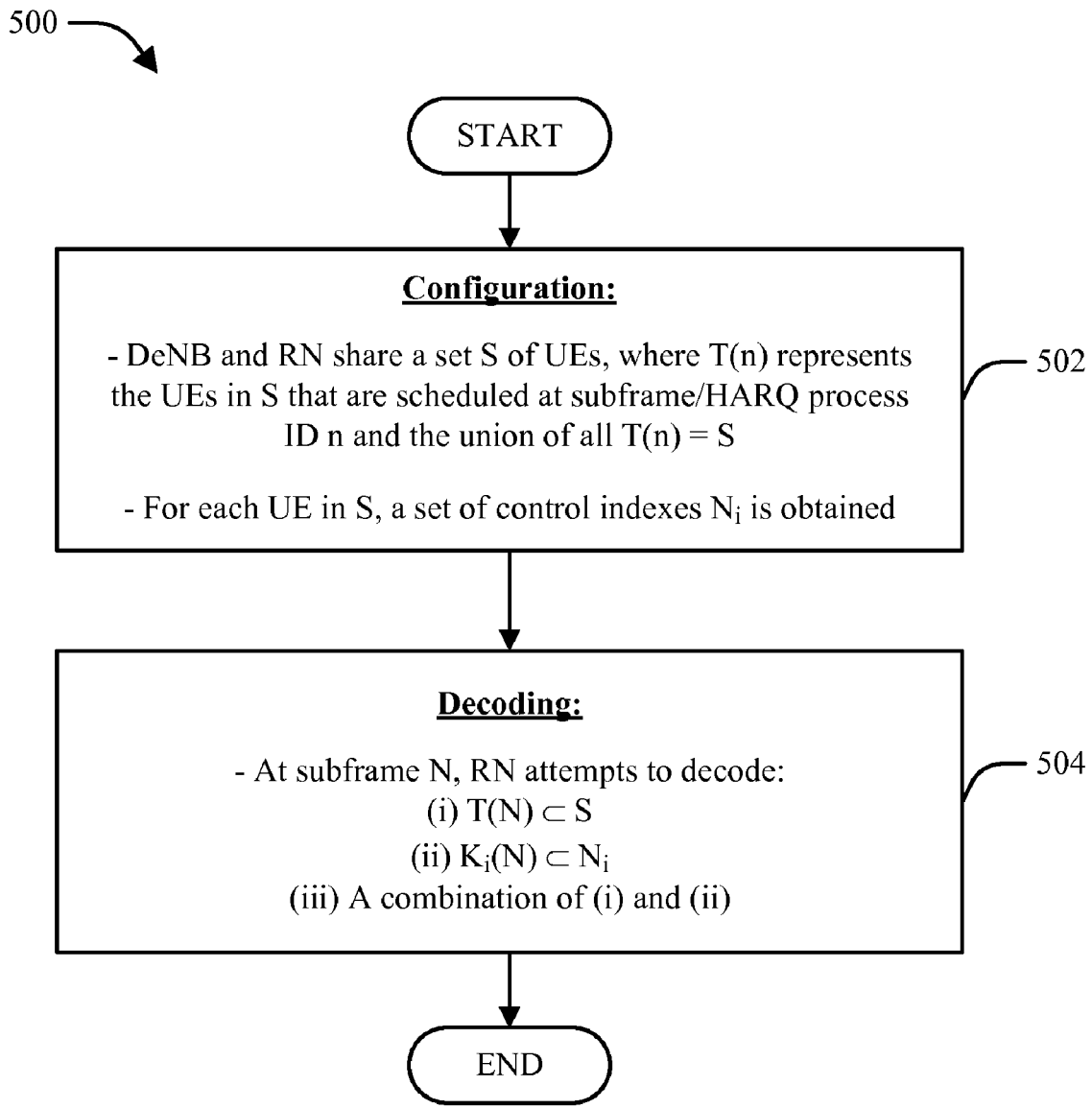
FIG. 5 is a flow diagram that illustrates operation of an example relay node in accordance with various aspects.

By way of illustration, candidate set processing module 220 can in one example operate as shown in flow diagram 500 in FIG. 5. As flow diagram 500 shows, candidate set processing can be performed as a configuration step 502 followed by a decoding step 504. As illustrated at configuration step 502, a DeNB and RN can share a set S of UEs, and for each UE in set S a set of control indexes $N_i$ can be identified. As further shown at configuration step 502, set S can be divided into subsets T(n) that include the respective UEs in set S that are scheduled at subframe (or HARQ process ID) n. Next, a RN operating according to flow diagram 500 can perform decoding step 504 at a subframe (or HARQ process ID) N by attempting to decode (i) a subset T(N) of UEs in set S that are scheduled at subframe (or HARQ process ID) N (e.g., as illustrated by system 400), (ii) a subset $K_i(N)$ of the control indexes $N_i$ for at least one UE in set S (e.g., as illustrated by system 300), or (iii) a combination of (i) and (ii).

Figure 6:
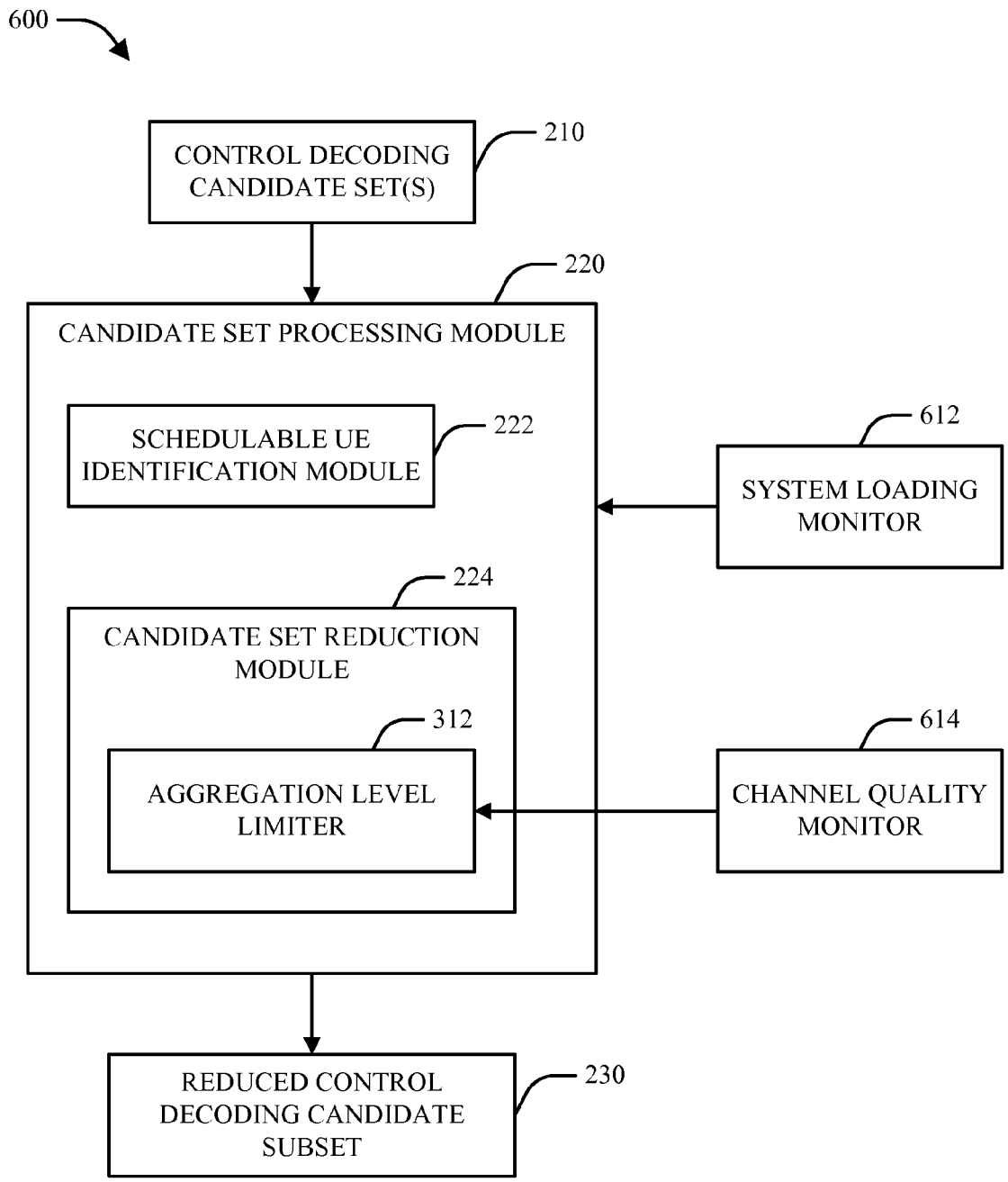
FIG. 6 is a block diagram of a system for control decoding candidate set processing based on system loading and/or channel quality in accordance with various aspects.

Turning next to FIG. 6, a system 600 for control decoding candidate set processing based on system loading and/or channel quality is illustrated. As shown in FIG. 6, system 600 can include a candidate set processing module 220, which can utilize a schedulable UE identification module 222, a candidate set reduction module 224, or the like to process control decoding candidate set(s) 210 into a reduced control decoding candidate subset 230 in accordance with various aspects as described herein. As further shown in FIG. 6, system 600 can monitor system loading via a system loading monitor 612, channel quality associated with respective associated UEs via a channel quality monitor, and/or other suitable network properties.

In one example, system loading monitor 612 can be utilized by candidate set processing module 220 to dynamically control the extent to which search space reduction is performed. By way of example, it can be appreciated that the common search space as described above can be utilized for broadcast traffic (e.g., paging, system information changes, random access messaging, etc.) as well as UE-specific traffic, as opposed to UE-specific search spaces for respective UEs.

Accordingly, if a system is substantially loaded, it can in some cases be undesirable to schedule UE-specific traffic on the common search space. Thus, system loading monitor 612 can enable candidate set processing module 220 (e.g., via candidate set reduction module 224) to operate such that the common search space is utilized only if an associated system is not loaded in order to manage the tradeoff between benefits of using the common search space and the additional required blind decodes. Stated another way, system loading monitor 612 can facilitate disabling of the common search space from the perspective of RN 120 as loading increases.

In another example, system loading monitor 612 can identify a level of system loading associated with a set of associated UEs, based on which candidate set processing module 220 can determine an extent to omit control decoding candidates from reduced control decoding candidate subset 230 in response to the identified system loading. Thus, operation of candidate set processing module 220 and the modules therein can be more generally configured in a dynamic manner based on system load. For example, as system loading decreases, candidate set processing module 220 can reduce the extent to which control decoding candidates are removed from reduced control decoding candidate subset 230.

In accordance with another aspect, removal of control decoding candidates for a given UE corresponding to respective aggregation levels can be based on channel quality associated with the UE as monitored by channel quality monitor 614. For example, aggregation level limiter 312 can identify one or more aggregation levels to include in reduced control decoding candidate subset 230 based at least in part on channel quality between respective UEs in a set of associated UEs and a DeNB for the respective UEs, as measured by channel quality monitor 614. For example, as noted above, as channel quality decreases, aggregation level limiter 312 can facilitate removal of control decoding candidates corresponding to lower aggregation levels.

Figure 7:
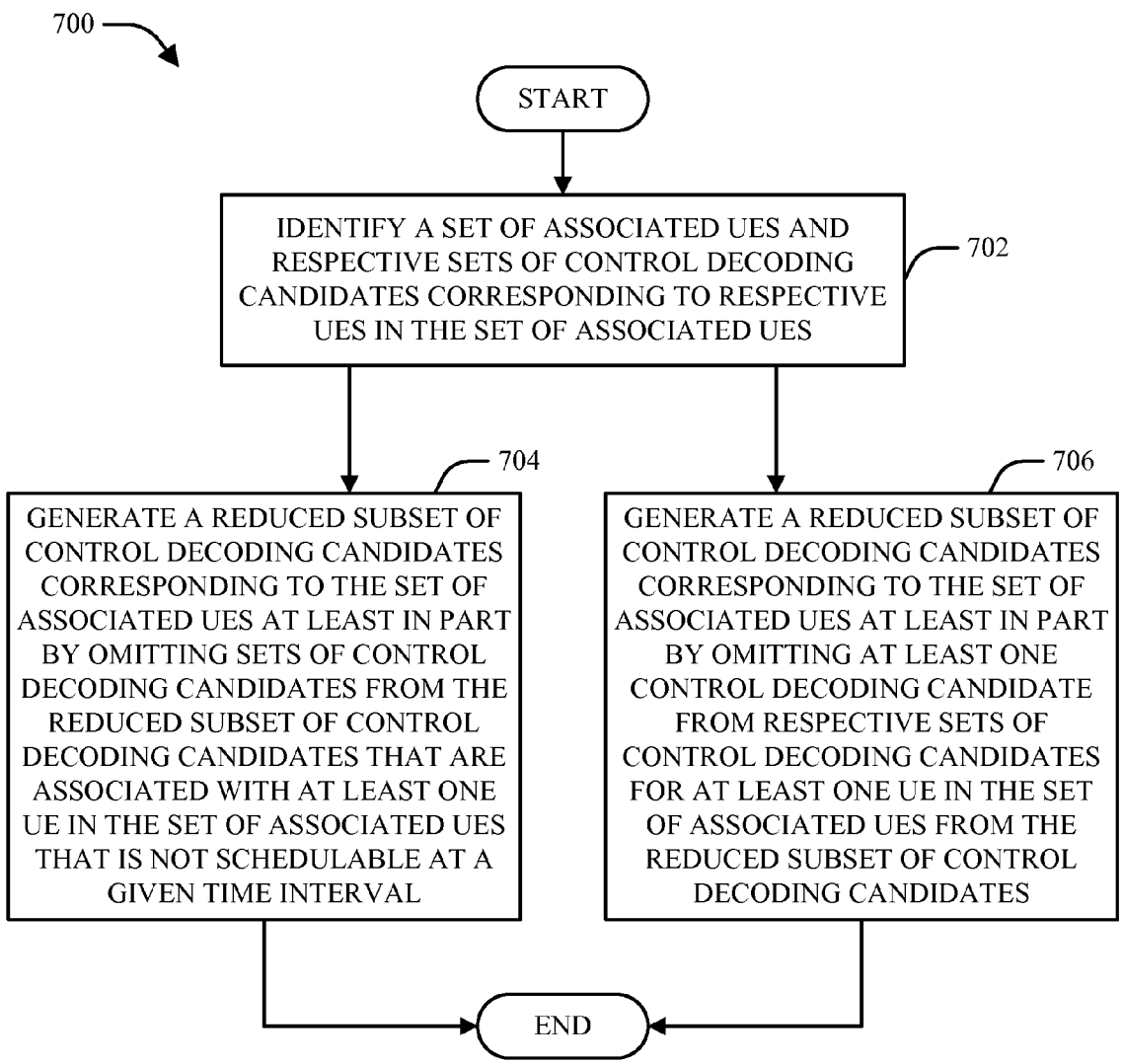
FIGS. 7-9 are flow diagrams of respective methodologies for efficient control decoding to facilitate transparent relay operation in a wireless communication system.
Figure 8:
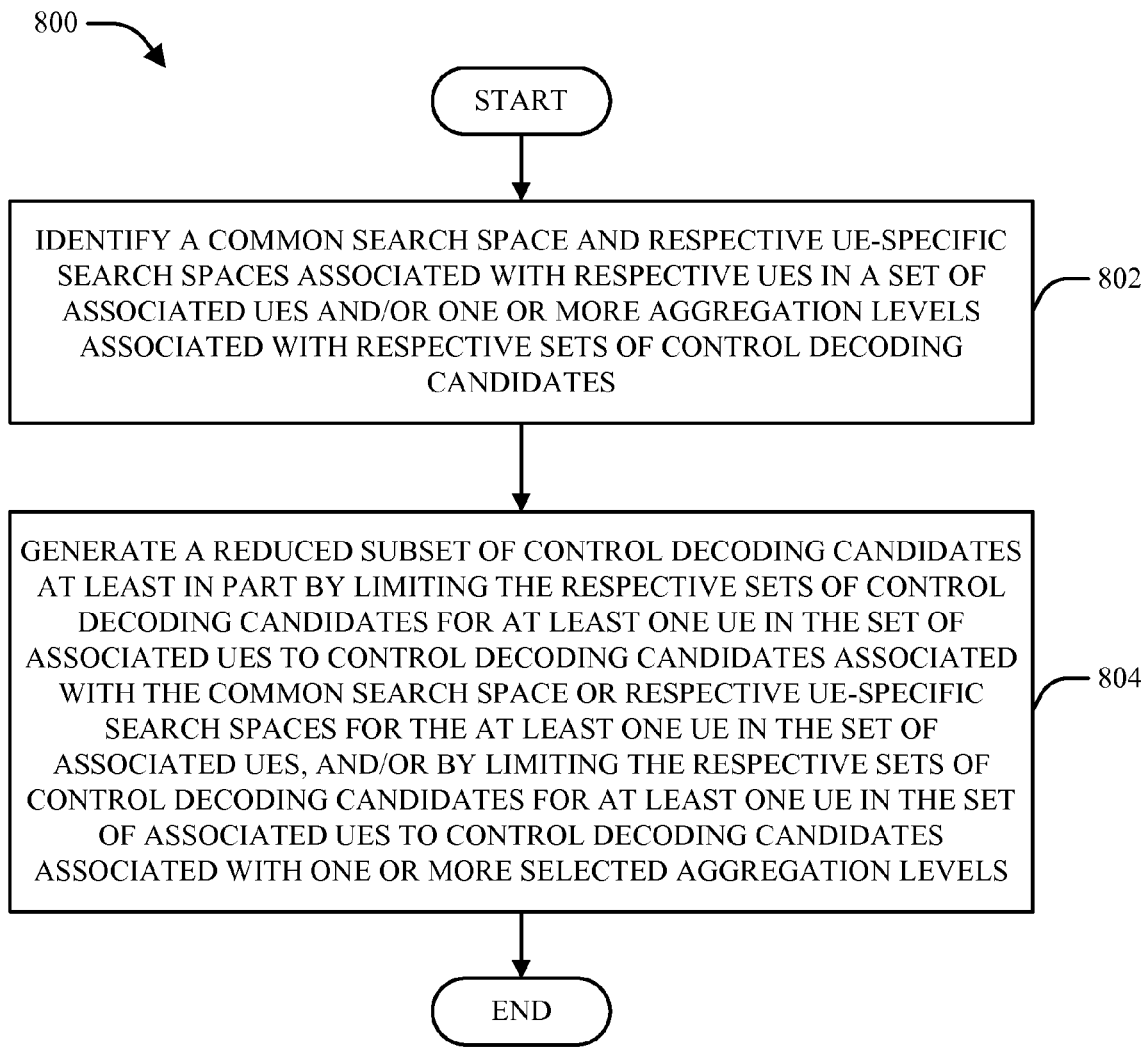
Figure 9:
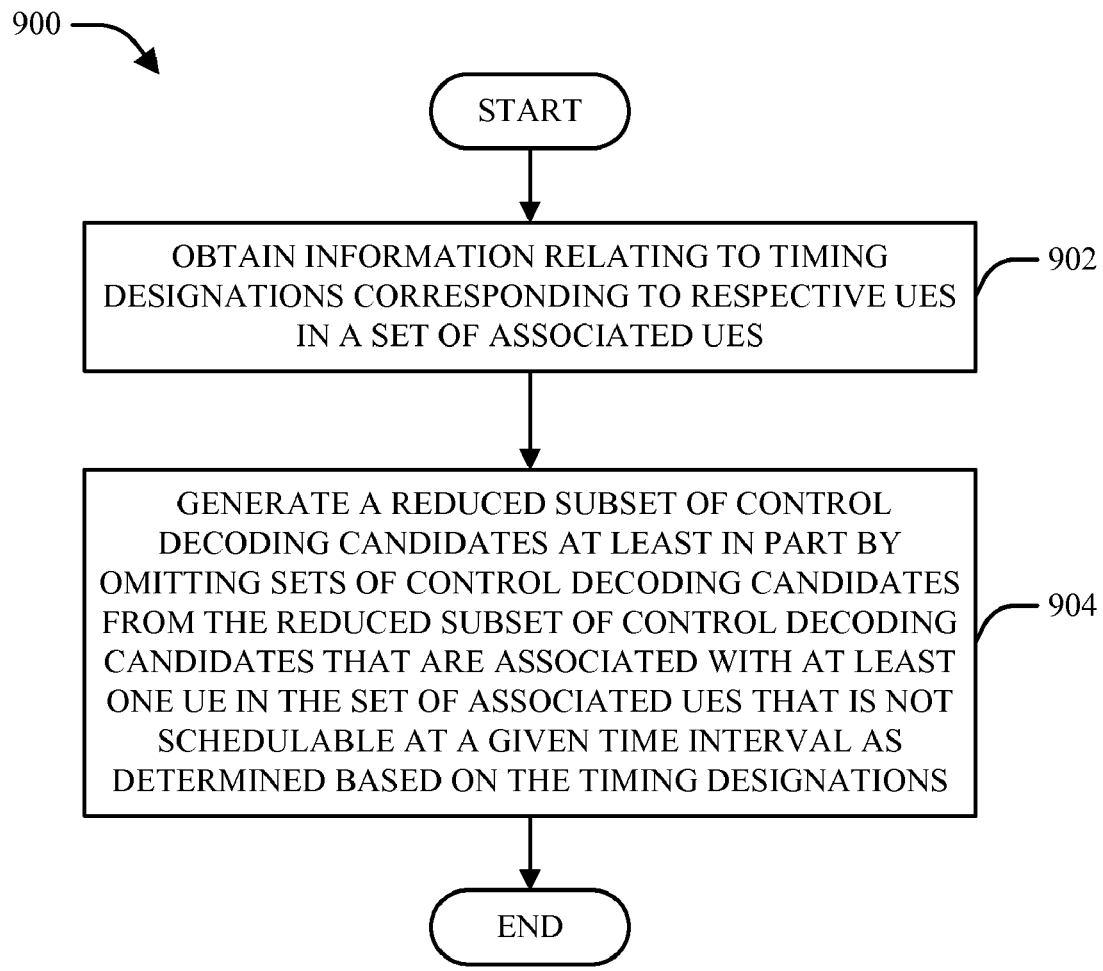

Referring now to FIGS. 7-9, methodologies that can be performed in accordance with various aspects set forth herein are illustrated. While, for purposes of simplicity of explanation, the methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

With reference to FIG. 7, illustrated is a methodology 700 for efficient control decoding to facilitate transparent relay operation in a wireless communication system. It is to be appreciated that methodology 700 can be performed by, for example, a relay node (e.g., RN 120) and/or any other appropriate network entity. Methodology 700 begins at block 702, wherein a set of associated UEs (e.g., UEs 130) and respective sets of control decoding candidates corresponding to respective UEs in the set of associated UEs are identified.

In accordance with one aspect, upon completing the acts described at block 702, methodology 700 can conclude at one or more of blocks 704 or 706. At block 704, a reduced subset of control decoding candidates corresponding to the set of associated UEs identified at block 702 is generated at least in part by omitting sets of control decoding candidates from the reduced subset of control decoding candidates that are associated with at least one UE in the set of associated UEs that is not schedulable at a given time interval. At block 706, a reduced subset of control decoding candidates corresponding to the set of associated UEs identified at block 702 is generated at least in part by omitting at least one control decoding candidate from respective sets of control decoding candidates for at least one UE in the set of associated UEs from the reduced subset of control decoding candidates.

Turning now to FIG. 8, a flow diagram of a second methodology 800 for efficient control decoding to facilitate transparent relay operation in a wireless communication system is illustrated. Methodology 800 can be performed by, for example, a relay node and/or any other appropriate network entity. Methodology 800 begins at block 802, wherein a common search space and respective UE-specific search spaces associated with respective UEs in a set of associated UEs and/or one or more aggregation levels associated with respective sets of control decoding candidates are identified. Methodology 800 can then conclude at block 804, wherein a reduced subset of control decoding candidates is generated at least in part by limiting (e.g., via a search space limiter 314) the respective sets of control decoding candidates for at least one UE in the set of associated UEs to control decoding candidates associated with the common search space or respective UE-specific search spaces for the at least one UE in the set of associated UEs, and/or by limiting (e.g., via an aggregation level limiter 312) the respective sets of control decoding candidates for at least one UE in the set of associated UEs to control decoding candidates associated with one or more selected aggregation levels.

FIG. 9 illustrates a third methodology 900 for efficient control decoding to facilitate transparent relay operation in a wireless communication system. Methodology 900 can be performed by, for example, a wireless network node serving as a relay node and/or any other suitable network entity. Methodology 900 begins at block 902, wherein information relating to timing designations corresponding to respective UEs in a set of associated UEs is obtained (e.g., by a resource designation processing module 412). Methodology 900 can then conclude at block 904, wherein a reduced subset of control decoding candidates is generated at least in part by omitting sets of control decoding candidates from the reduced subset of control decoding candidates that are associated with at least one UE in the set of associated UEs that is not schedulable at a given time interval as determined (e.g., by resource designation processing module 412 and/or a resource identifier 414) based on the timing designations.

Figure 10:
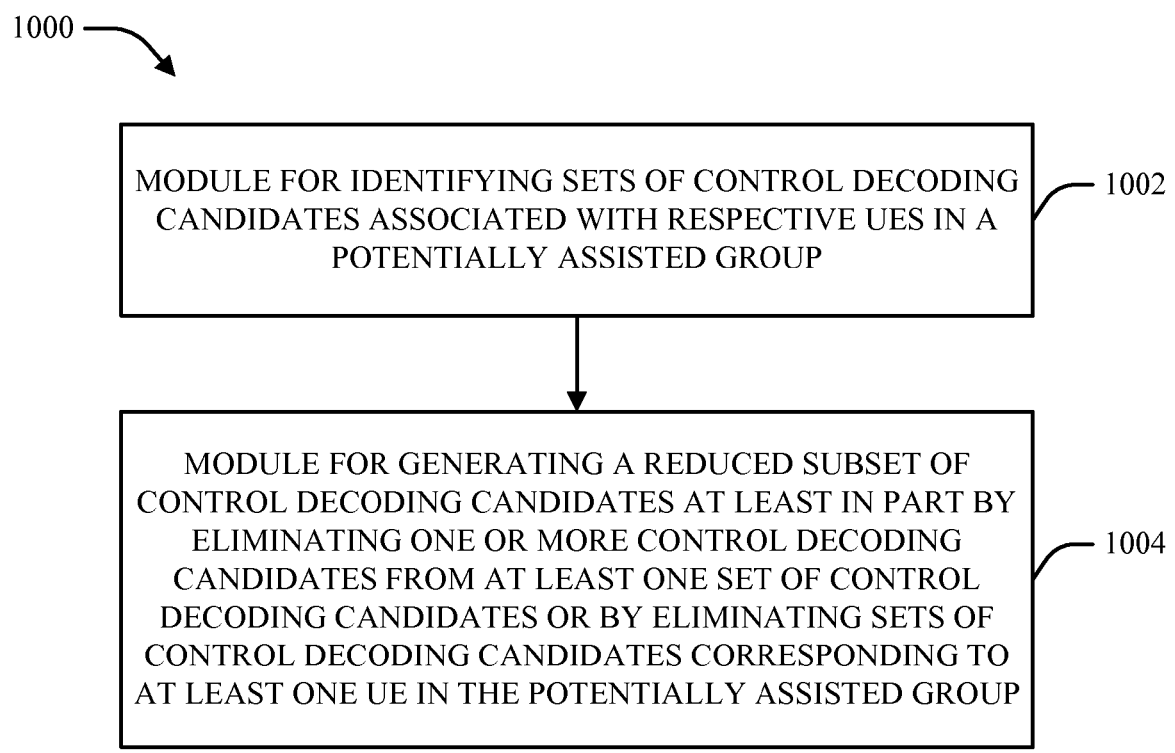
FIG. 10 is a block diagram of an apparatus that facilitates control decoding search space processing in a relay-assisted wireless communication system.

Referring next to FIG. 10, an apparatus 1000 that facilitates control decoding search space processing in a relay-assisted wireless communication system is illustrated. It is to be appreciated that apparatus 1000 is represented as including functional blocks, which can be functional blocks that represent functions implemented by a processor, software, or combination thereof (e.g., firmware). Apparatus 1000 can be implemented by a relay node (e.g., RN 120) and/or any other suitable network entity and can include a module 1002 for identifying sets of control decoding candidates associated with respective UEs in a potentially assisted group and a module 1004 for generating a reduced subset of control decoding candidates at least in part by eliminating one or more control decoding candidates from at least one set of control decoding candidates or by eliminating sets of control decoding candidates corresponding to at least one UE in the potentially assisted group.

Figure 11:
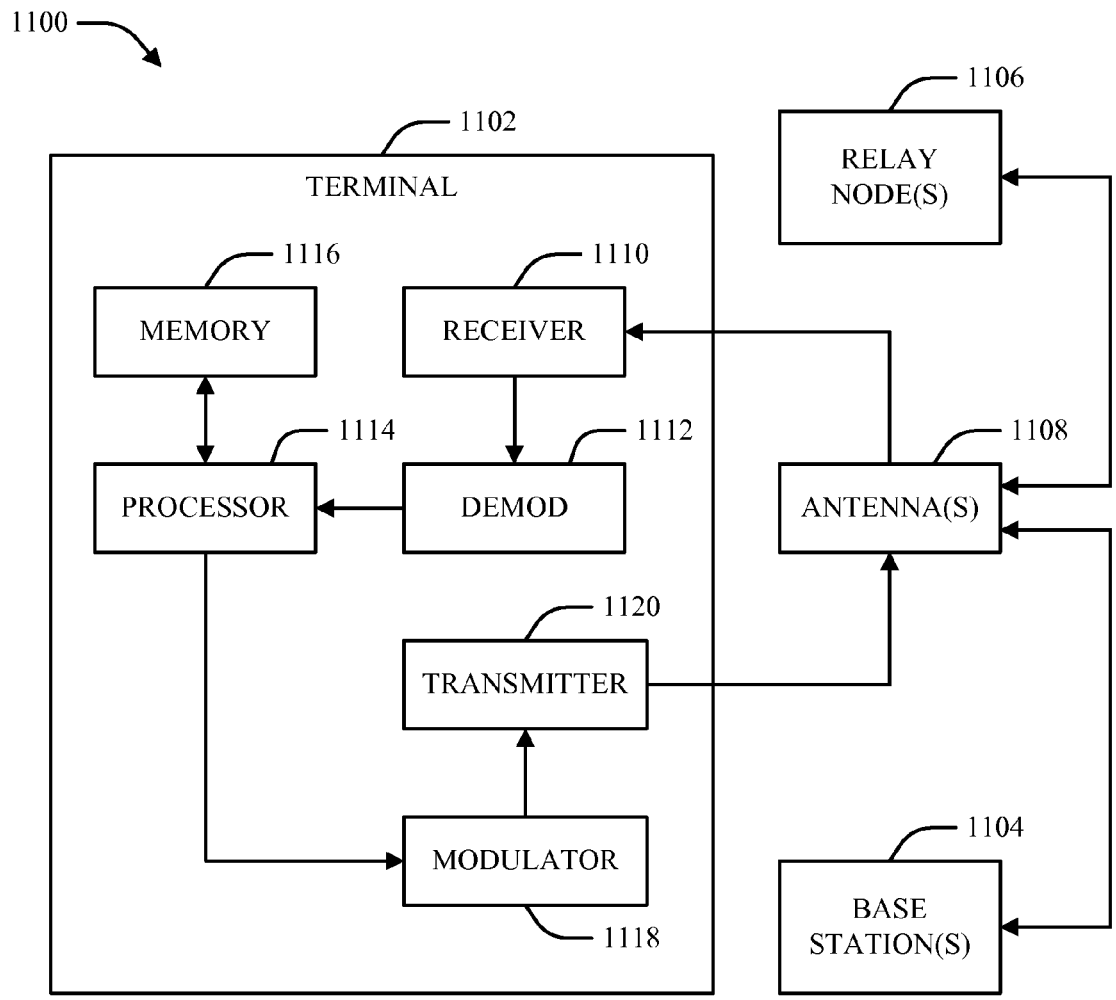
FIGS. 11-12 are block diagrams of respective wireless communication devices that can be utilized to implement various aspects described herein.

FIG. 11 is a block diagram of a system 1100 that can be utilized to implement various aspects of the functionality described herein. In one example, system 1100 includes a mobile terminal 1102. As illustrated, mobile terminal 1102 can receive signal(s) from one or more base stations 1104 and transmit to the one or more base stations 1104 via one or more antennas 1108. Additionally or alternatively, mobile terminal 1102 can communicate with one or more relay nodes 1106 via antenna(s) 1108. Further, mobile terminal 1102 can comprise a receiver 1110 that receives information from antenna(s) 1108. In one example, receiver 1110 can be operatively associated with a demodulator (Demod) 1112 that demodulates received information. Demodulated symbols can then be analyzed by a processor 1114. Processor 1114 can be coupled to memory 1116, which can store data and/or program codes related to mobile terminal 1102. Mobile terminal 1102 can also include a modulator 1118 that can multiplex a signal for transmission by a transmitter 1120 through antenna(s) 1108.

Figure 12:
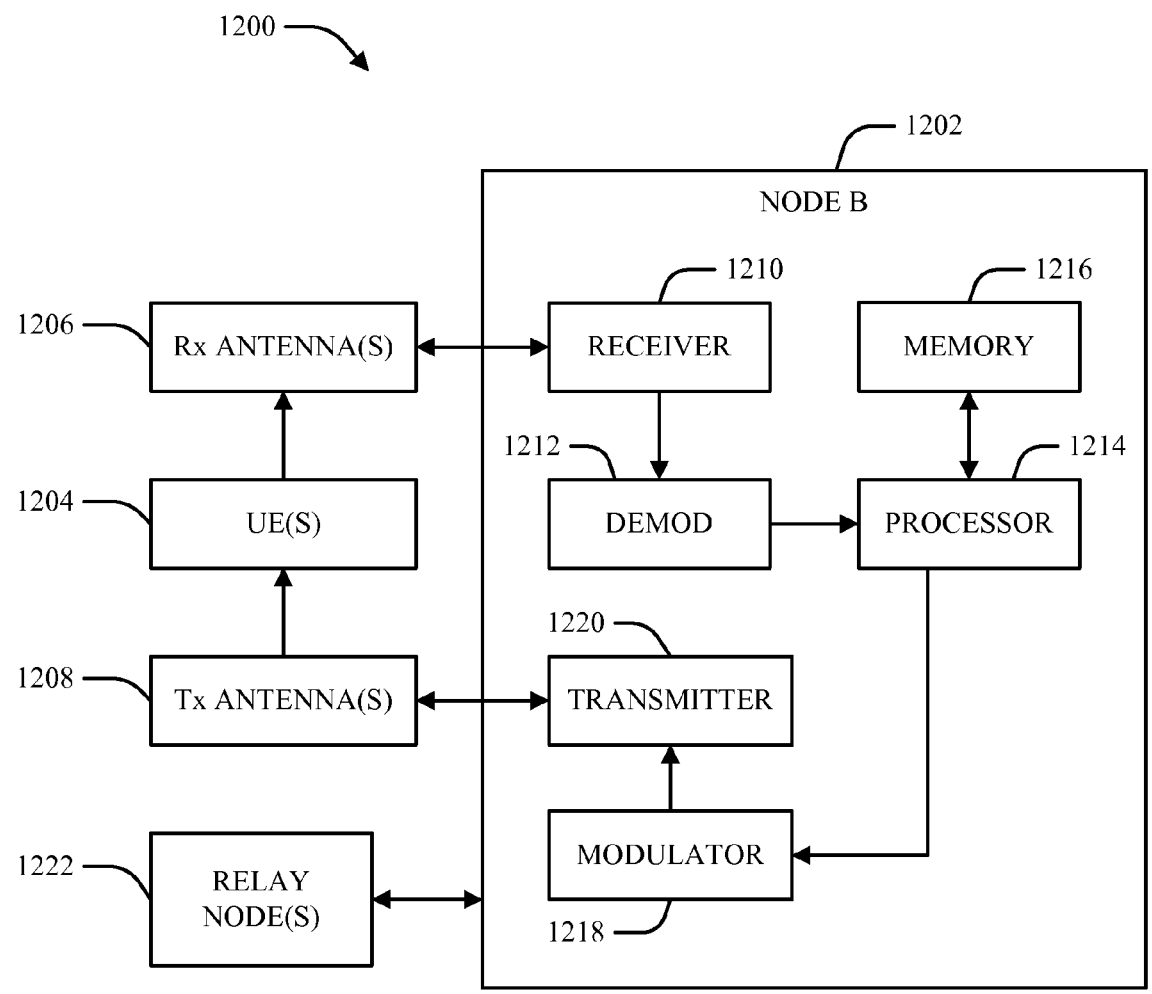

FIG. 12 is a block diagram of another system 1200 that can be utilized to implement various aspects of the functionality described herein. In one example, system 1200 includes a base station or Node B 1202. As illustrated, Node B 1202 can receive signal(s) from one or more UEs 1204 via one or more receive (Rx) antennas 1206 and transmit to the one or more UEs 1204 via one or more transmit (Tx) antennas 1208. Additionally, Node B 1202 can comprise a receiver 1210 that receives information from receive antenna(s) 1206. In one example, the receiver 1210 can be operatively associated with a demodulator (Demod) 1212 that demodulates received information. Demodulated symbols can then be analyzed by a processor 1214. Processor 1214 can be coupled to memory 1216, which can store information related to code clusters, access terminal assignments, lookup tables related thereto, unique scrambling sequences, and/or other suitable types of information. Node B 1202 can also include a modulator 1218 that can multiplex a signal for transmission by a transmitter 1220 through transmit antenna(s) 1208. In one example, Node B 1202 can be further connected to one or more relay nodes 1222 via a backhaul link and/or other suitable means. Relay node(s) 1222, and/or Node B 1202, can be operable to perform methodologies 700-900 and/or other similar and appropriate methodologies.

Figure 13:
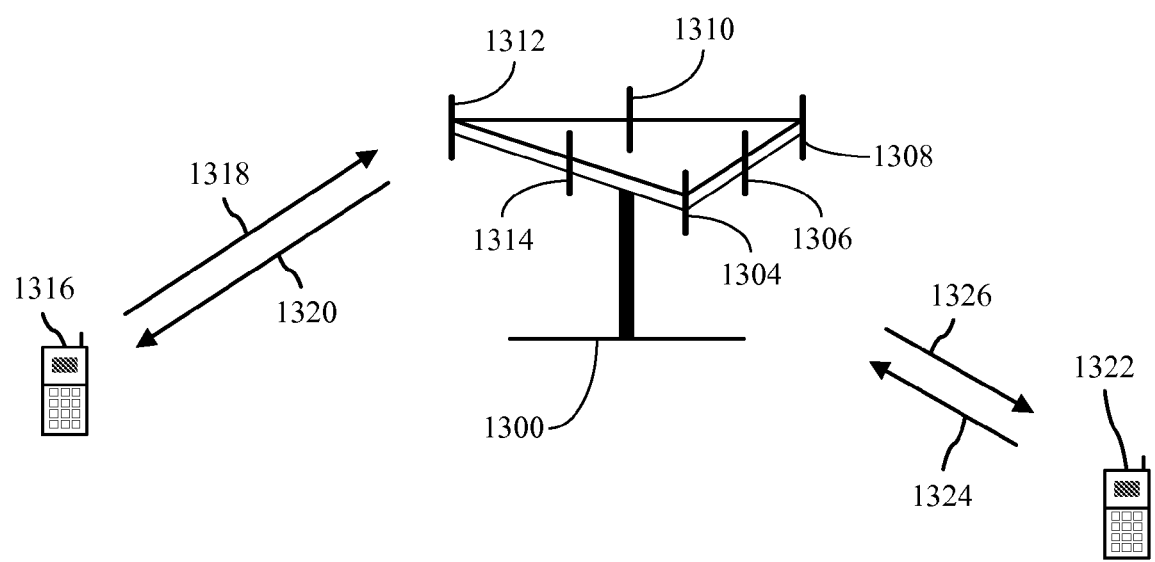
FIG. 13 illustrates a wireless multiple-access communication system in accordance with various aspects set forth herein.

Referring now to FIG. 13, an illustration of a wireless multiple-access communication system is provided in accordance with various aspects. In one example, an access point 1300 (AP) includes multiple antenna groups. As illustrated in FIG. 13, one antenna group can include antennas 1304 and 1306, another can include antennas 1308 and 1310, and another can include antennas 1312 and 1314. While only two antennas are shown in FIG. 13 for each antenna group, it should be appreciated that more or fewer antennas may be utilized for each antenna group. In another example, an access terminal 1316 can be in communication with antennas 1312 and 1314, where antennas 1312 and 1314 transmit information to access terminal 1316 over forward link 1320 and receive information from access terminal 1316 over reverse link 1318. Additionally and/or alternatively, access terminal 1322 can be in communication with antennas 1306 and 1308, where antennas 1306 and 1308 transmit information to access terminal 1322 over forward link 1326 and receive information from access terminal 1322 over reverse link 1324. In a frequency division duplex system, communication links 1318, 1320, 1324 and 1326 can use different frequency for communication. For example, forward link 1320 may use a different frequency then that used by reverse link 1318.

Each group of antennas and/or the area in which they are designed to communicate can be referred to as a sector of the access point. In accordance with one aspect, antenna groups can be designed to communicate to access terminals in a sector of areas covered by access point 1300. In communication over forward links 1320 and 1326, the transmitting antennas of access point 1300 can utilize beamforming in order to improve the signal-to-noise ratio of forward links for the different access terminals 1316 and 1322. Also, an access point using beamforming to transmit to access terminals scattered randomly through its coverage causes less interference to access terminals in neighboring cells than an access point transmitting through a single antenna to all its access terminals.

An access point, e.g., access point 1300, can be a fixed station used for communicating with terminals and can also be referred to as a base station, an eNB, an access network, and/or other suitable terminology. In addition, an access terminal, e.g., an access terminal 1316 or 1322, can also be referred to as a mobile terminal, user equipment, a wireless communication device, a terminal, a wireless terminal, and/or other appropriate terminology.

Figure 14:
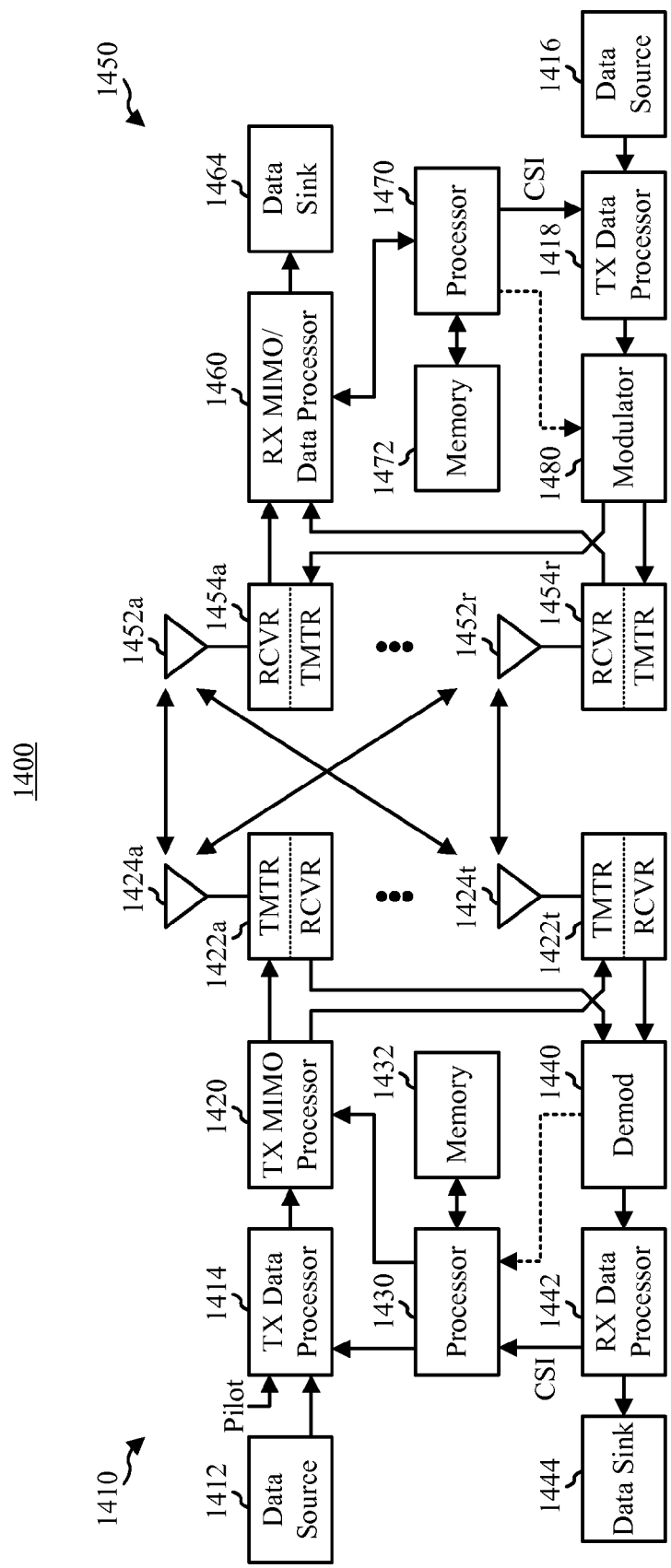
FIG. 14 is a block diagram illustrating an example wireless communication system in which various aspects described herein can function.

Referring now to FIG. 14, a block diagram illustrating an example wireless communication system 1400 in which various aspects described herein can function is provided. In one example, system 1400 is a multiple-input multiple-output (MIMO) system that includes a transmitter system 1410 and a receiver system 1450. It should be appreciated, however, that transmitter system 1410 and/or receiver system 1450 could also be applied to a multi-input single-output system wherein, for example, multiple transmit antennas (e.g., on a base station), can transmit one or more symbol streams to a single antenna device (e.g., a mobile station). Additionally, it should be appreciated that aspects of transmitter system 1410 and/or receiver system 1450 described herein could be utilized in connection with a single output to single input antenna system.

In accordance with one aspect, traffic data for a number of data streams are provided at transmitter system 1410 from a data source 1412 to a transmit (TX) data processor 1414. In one example, each data stream can then be transmitted via a respective transmit antenna 1424. Additionally, TX data processor 1414 can format, encode, and interleave traffic data for each data stream based on a particular coding scheme selected for each respective data stream in order to provide coded data. In one example, the coded data for each data stream can then be multiplexed with pilot data using OFDM techniques. The pilot data can be, for example, a known data pattern that is processed in a known manner. Further, the pilot data can be used at receiver system 1450 to estimate channel response. Back at transmitter system 1410, the multiplexed pilot and coded data for each data stream can be modulated (e.g., symbol mapped) based on a particular modulation scheme (e.g., BPSK, QSPK, M-PSK, or M-QAM) selected for each respective data stream in order to provide modulation symbols. In one example, data rate, coding, and modulation for each data stream can be determined by instructions performed on and/or provided by processor 1430.

Next, modulation symbols for all data streams can be provided to a TX MIMO processor 1420, which can further process the modulation symbols (e.g., for OFDM). TX MIMO processor 1420 can then provides $N_T$ modulation symbol streams to $N_T$ transceivers 1422a through 1422t. In one example, each transceiver 1422 can receive and process a respective symbol stream to provide one or more analog signals. Each transceiver 1422 can then further condition (e.g., amplify, filter, and upconvert) the analog signals to provide a modulated signal suitable for transmission over a MIMO channel. Accordingly, $N_T$ modulated signals from transceivers 1422a through 1422t can then be transmitted from $N_T$ antennas 1424a through 1424t, respectively.

In accordance with another aspect, the transmitted modulated signals can be received at receiver system 1450 by $N_R$ antennas 1452a through 1452r. The received signal from each antenna 1452 can then be provided to respective transceivers 1454. In one example, each transceiver 1454 can condition (e.g., filter, amplify, and downconvert) a respective received signal, digitize the conditioned signal to provide samples, and then processes the samples to provide a corresponding "received" symbol stream. An RX MIMO/data processor 1460 can then receive and process the $N_R$ received symbol streams from $N_R$ transceivers 1454 based on a particular receiver processing technique to provide $N_T$ "detected" symbol streams. In one example, each detected symbol stream can include symbols that are estimates of the modulation symbols transmitted for the corresponding data stream. RX processor 1460 can then process each symbol stream at least in part by demodulating, deinterleaving, and decoding each detected symbol stream to recover traffic data for a corresponding data stream. Thus, the processing by RX processor 1460 can be complementary to that performed by TX MIMO processor 1420 and TX data processor 1414 at transmitter system 1410. RX processor 1460 can additionally provide processed symbol streams to a data sink 1464.

In accordance with one aspect, the channel response estimate generated by RX processor 1460 can be used to perform space/time processing at the receiver, adjust power levels, change modulation rates or schemes, and/or other appropriate actions. Additionally, RX processor 1460 can further estimate channel characteristics such as, for example, signal-to-noise-and-interference ratios (SNRs) of the detected symbol streams. RX processor 1460 can then provide estimated channel characteristics to a processor 1470. In one example, RX processor 1460 and/or processor 1470 can further derive an estimate of the "operating" SNR for the system. Processor 1470 can then provide channel state information (CSI), which can comprise information regarding the communication link and/or the received data stream. This information can include, for example, the operating SNR. The CSI can then be processed by a TX data processor 1418, modulated by a modulator 1480, conditioned by transceivers 1454a through 1454r, and transmitted back to transmitter system 1410. In addition, a data source 1416 at receiver system 1450 can provide additional data to be processed by TX data processor 1418.

Back at transmitter system 1410, the modulated signals from receiver system 1450 can then be received by antennas 1424, conditioned by transceivers 1422, demodulated by a demodulator 1440, and processed by a RX data processor 1442 to recover the CSI reported by receiver system 1450. In one example, the reported CSI can then be provided to processor 1430 and used to determine data rates as well as coding and modulation schemes to be used for one or more data streams. The determined coding and modulation schemes can then be provided to transceivers 1422 for quantization and/or use in later transmissions to receiver system 1450. Additionally and/or alternatively, the reported CSI can be used by processor 1430 to generate various controls for TX data processor 1414 and TX MIMO processor 1420. In another example, CSI and/or other information processed by RX data processor 1442 can be provided to a data sink 1444.

In one example, processor 1430 at transmitter system 1410 and processor 1470 at receiver system 1450 direct operation at their respective systems. Additionally, memory 1432 at transmitter system 1410 and memory 1472 at receiver system 1450 can provide storage for program codes and data used by processors 1430 and 1470, respectively. Further, at receiver system 1450, various processing techniques can be used to process the $N_R$ received signals to detect the $N_T$ transmitted symbol streams. These receiver processing techniques can include spatial and space-time receiver processing techniques, which can also be referred to as equalization techniques, and/or "successive nulling/equalization and interference cancellation" receiver processing techniques, which can also be referred to as "successive interference cancellation" or "successive cancellation" receiver processing techniques.

It is to be understood that the aspects described herein can be implemented by hardware, software, firmware, middleware, microcode, or any combination thereof. When the systems and/or methods are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method, comprising:
    identifying a set of associated user equipment units (UEs) and respective sets of control decoding candidates corresponding to respective UEs in the set of associated UEs; and
    generating a reduced subset of control decoding candidates corresponding to the set of associated UEs at least in part by performing one or more of:
        omitting sets of control decoding candidates from the reduced subset of control decoding candidates that are associated with at least one UE in the set of associated UEs that is not schedulable at a given time interval; or
        omitting at least one control decoding candidate from respective sets of control decoding candidates for at least one UE in the set of associated UEs from the reduced subset of control decoding candidates.

2. The method of claim 1, further comprising determining at least one newly scheduled UE from the set of associated UEs based at least in part on the reduced subset of control decoding candidates.

3. The method of claim 1, wherein the generating comprises:
    obtaining information relating to timing designations corresponding to respective UEs in the set of associated UEs; and
    generating the reduced subset of control decoding candidates at least in part by omitting sets of control decoding candidates from the reduced subset of control decoding candidates that are associated with at least one UE in the set of associated UEs that is not schedulable at a given time interval as determined based on the timing designations.

4. The method of claim 3, wherein the timing designations correspond to designated subframes for respective UEs in the set of associated UEs.

5. The method of claim 3, wherein the timing designations correspond to designated Hybrid Automatic Repeat Request (HARQ) process identifiers (IDs) for respective UEs in the set of associated UEs.

6. The method of claim 5, wherein the generating further comprises identifying at least one UE in the set of associated UEs that is not schedulable at a given time interval at least in part by comparing HARQ process IDs corresponding to respective UEs in the set of associated UEs to a HARQ process ID corresponding to the given time interval.

7. The method of claim 3, wherein the obtaining information comprises receiving signaling relating to timing designations corresponding to respective UEs in the set of associated UEs from a Donor Evolved Node B (DeNB) associated with the respective UEs in the set of associated UEs.

8. The method of claim 1, wherein the generating comprises:
    identifying a common search space and respective UE-specific search spaces associated with respective UEs in the set of associated UEs; and
    generating the reduced subset of control decoding candidates at least in part by limiting the respective sets of control decoding candidates for at least one UE in the set of associated UEs to control decoding candidates associated with the common search space or respective UE-specific search spaces for the at least one UE in the set of associated UEs.

9. The method of claim 8, wherein the generating further comprises:
    identifying a level of system loading associated with the set of associated UEs; and
    selectively including or omitting control decoding candidates associated with the common search space from the reduced subset of control decoding candidates in response to a identified level of system loading associated with the set of associated UEs.

10. The method of claim 1, wherein the generating comprises:
    identifying one or more aggregation levels associated with the respective sets of control decoding candidates; and
    generating the reduced subset of control decoding candidates at least in part by limiting the respective sets of control decoding candidates for at least one UE in the set of associated UEs to control decoding candidates associated with one or more selected aggregation levels.

11. The method of claim 10, wherein the generating further comprises identifying the one or more selected aggregation levels based at least in part on channel quality between respective UEs in the set of associated UEs and a Donor Evolved Node B (DeNB) for the respective UEs in the set of associated UEs.

12. The method of claim 1, wherein the generating comprises:
  identifying one or more control channel sizes associated with the respective sets of control decoding candidates; and
  generating the reduced subset of control decoding candidates at least in part by limiting the respective sets of control decoding candidates for at least one UE in the set of associated UEs to control decoding candidates associated with a one or more selected control channel sizes.

13. The method of claim 1, wherein the generating comprises:
  identifying a level of system loading associated with the set of associated UEs; and
  determining an extent to omit control decoding candidates from the reduced subset of control decoding candidates in response to a identified level of system loading associated with the set of associated UEs.

14. The method of claim 1, wherein the control decoding candidates correspond to respective Physical Downlink Control Channel (PDCCH) blind decodes.

15. The method of claim 14, wherein respective PDCCH blind decodes are associated with a cyclic redundancy check (CRC) field of greater than 16 bits.

16. The method of claim 1, wherein the identifying comprises identifying respective control decoding candidates corresponding to candidate resources for Physical Downlink Control Channel (PDCCH) grants, and wherein the respective control decoding candidates corresponding to candidate resources for PDCCH grants are configured such that PDCCH grants including downlink PDCCH grants and uplink PDCCH grants are provided at different subframes via time division multiplexing.

17. A wireless communications apparatus, comprising:
  a memory that stores data relating to a set of associated user equipment units (UEs) and respective sets of control decoding candidates corresponding to respective UEs in the set of associated UEs; and
  a processor configured to generate a reduced subset of control decoding candidates corresponding to the set of associated UEs at least in part by performing one or more of omitting sets of control decoding candidates from the reduced subset of control decoding candidates that are associated with at least one UE in the set of associated UEs that is not schedulable at a given time interval or omitting at least one control decoding candidate from respective sets of control decoding candidates for at least one UE in the set of associated UEs from the reduced subset of control decoding candidates.

18. The wireless communications apparatus of claim 17, wherein:
  the memory further stores data relating to timing designations corresponding to respective UEs in the set of associated UEs; and
  the processor is further configured to generate the reduced subset of control decoding candidates at least in part by omitting sets of control decoding candidates from the reduced subset of control decoding candidates that are associated with at least one UE in the set of associated UEs that is not schedulable at a given time interval as determined based on the timing designations.

19. The wireless communications apparatus of claim 18, wherein the timing designations correspond to designated subframes for respective UEs in the set of associated UEs.

20. The wireless communications apparatus of claim 18, wherein the timing designations correspond to designated Hybrid Automatic Repeat Request (HARQ) process identifiers (IDs) for respective UEs in the set of associated UEs.

21. The wireless communications apparatus of claim 20, wherein the processor is further configured to identify at least one UE in the set of associated UEs that is not schedulable at a given time interval at least in part by comparing HARQ process IDs corresponding to respective UEs in the set of associated UEs to a HARQ process ID corresponding to the given time interval.

22. The wireless communications apparatus of claim 17, wherein:
  the memory further stores data relating to a common search space and respective UE-specific search spaces associated with respective UEs in the set of associated UEs; and
  the processor is further configured to generate the reduced subset of control decoding candidates at least in part by limiting the respective sets of control decoding candidates for at least one UE in the set of associated UEs to control decoding candidates associated with the common search space or respective UE-specific search spaces for the at least one UE in the set of associated UEs.

23. The wireless communications apparatus of claim 22, wherein:
  the memory further stores data relating to a level of system loading associated with the set of associated UEs; and
  the processor is further configured to selectively include or omit control decoding candidates associated with the common search space from the reduced subset of control decoding candidates in response to a identified level of system loading associated with the set of associated UEs.

24. The wireless communications apparatus of claim 17, wherein:
  the memory further stores data relating to one or more aggregation levels associated with the respective sets of control decoding candidates; and
  the processor is further configured to generate the reduced subset of control decoding candidates at least in part by limiting the respective sets of control decoding candidates for at least one UE in the set of associated UEs to control decoding candidates associated with one or more selected aggregation levels.

25. The wireless communications apparatus of claim 17, wherein:
  the memory further stores data relating to one or more control channel sizes associated with the respective sets of control decoding candidates; and
  the processor is further configured to generate the reduced subset of control decoding candidates at least in part by limiting the respective sets of control decoding candidates for at least one UE in the set of associated UEs to control decoding candidates associated with a one or more selected control channel sizes.

26. The wireless communications apparatus of claim 17, wherein:
  the memory further stores data relating to a level of system loading associated with the set of associated UEs; and
  the processor is further configured to determine an extent to omit control decoding candidates from the reduced subset of control decoding candidates in response to a identified level of system loading associated with the set of associated UEs.

27. The wireless communications apparatus of claim 17, wherein the control decoding candidates correspond to respective Physical Downlink Control Channel (PDCCH)

blind decodes associated with a cyclic redundancy check (CRC) field of greater than 16 bits.

28. The wireless communications apparatus of claim 17, wherein the processor is further configured to identify respective control decoding candidates corresponding to candidate resources for Physical Downlink Control Channel (PDCCH) grants, and wherein the respective control decoding candidates corresponding to candidate resources for PDCCH grants are configured such that PDCCH grants including downlink PDCCH grants and uplink PDCCH grants are provided at different subframes via time division multiplexing.

29. An apparatus, comprising:
means for identifying sets of control decoding candidates associated with respective user equipment units (UEs) in a potentially assisted group; and
means for generating a reduced subset of control decoding candidates at least in part by eliminating one or more control decoding candidates from at least one set of control decoding candidates or by eliminating sets of control decoding candidates corresponding to at least one UE in the potentially assisted group.

30. The apparatus of claim 29, wherein the means for generating comprises:
means for obtaining information relating to timing designations corresponding to respective UEs in the potentially assisted group; and
means for generating the reduced subset of control decoding candidates at least in part by omitting sets of control decoding candidates from the reduced subset of control decoding candidates that are associated with at least one UE in the potentially assisted group that is not schedulable at a given time interval as determined based on the timing designations.

31. The apparatus of claim 30, wherein the timing designations correspond to designated subframes for respective UEs in the potentially assisted group.

32. The apparatus of claim 30, wherein the timing designations correspond to designated Hybrid Automatic Repeat Request (HARQ) process identifiers (IDs) for respective UEs in the potentially assisted group.

33. The apparatus of claim 32, wherein the means for generating further comprises means for identifying at least one UE in the potentially assisted group that is not schedulable at a given time interval at least in part by comparing HARQ process IDs corresponding to respective UEs in the potentially assisted group to a HARQ process ID corresponding to the given time interval.

34. The apparatus of claim 29, wherein the means for generating comprises:
means for identifying a common search space and respective UE-specific search spaces associated with respective UEs in the potentially assisted group; and
means for generating the reduced subset of control decoding candidates at least in part by limiting the respective sets of control decoding candidates for at least one UE in the potentially assisted group to control decoding candidates associated with the common search space or respective UE-specific search spaces for the at least one UE in the potentially assisted group.

35. The apparatus of claim 34, wherein the means for generating further comprises:
means for identifying a level of system loading associated with the potentially assisted group; and
means for selectively including or omitting control decoding candidates associated with the common search space from the reduced subset of control decoding candidates in response to a identified level of system loading associated with the potentially assisted group.

36. The apparatus of claim 29, wherein the means for generating comprises:
means for identifying one or more aggregation levels associated with the respective sets of control decoding candidates; and
means for generating the reduced subset of control decoding candidates at least in part by limiting the respective sets of control decoding candidates for at least one UE in the potentially assisted group to control decoding candidates associated with one or more selected aggregation levels.

37. The apparatus of claim 29, wherein the means for generating comprises:
means for identifying one or more control channel sizes associated with the respective sets of control decoding candidates; and
means for generating the reduced subset of control decoding candidates at least in part by limiting the respective sets of control decoding candidates for at least one UE in the potentially assisted group to control decoding candidates associated with a one or more selected control channel sizes.

38. The apparatus of claim 29, wherein the means for generating comprises:
means for identifying a level of system loading associated with the potentially assisted group; and
means for determining an extent to omit control decoding candidates from the reduced subset of control decoding candidates in response to a identified level of system loading associated with the potentially assisted group.

39. The apparatus of claim 29, wherein the control decoding candidates correspond to respective Physical Downlink Control Channel (PDCCH) blind decodes associated with a cyclic redundancy check (CRC) field of greater than 16 bits.

40. A computer program product, comprising:
a non-transitory computer-readable medium having program code recorded thereon, the program code comprising:
code for causing a computer to identify sets of control decoding candidates associated with respective user equipment units (UEs) in a potentially assisted group; and
code for causing a computer to generate a reduced subset of control decoding candidates at least in part by eliminating one or more control decoding candidates from at least one set of control decoding candidates or by eliminating sets of control decoding candidates corresponding to at least one UE in the potentially assisted group.

41. The computer program product of claim 40, wherein the code for causing a computer to generate comprises:
code for causing a computer to obtain information relating to timing designations corresponding to respective UEs in the potentially assisted group; and
code for causing a computer to generate the reduced subset of control decoding candidates at least in part by omitting sets of control decoding candidates from the reduced subset of control decoding candidates that are associated with at least one UE in the potentially assisted group that is not schedulable at a given time interval as determined based on the timing designations.

42. The computer program product of claim 41, wherein the timing designations correspond to designated subframes for respective UEs in the potentially assisted group.

43. The computer program product of claim 41, wherein the timing designations correspond to designated Hybrid Automatic Repeat Request (HARQ) process identifiers (IDs) for respective UEs in the potentially assisted group.

44. The computer program product of claim 43, wherein the code for causing a computer to generate further comprises code for causing a computer to identify at least one UE in the potentially assisted group that is not schedulable at a given time interval at least in part by comparing HARQ process IDs corresponding to respective UEs in the potentially assisted group to a HARQ process ID corresponding to the given time interval.

45. The computer program product of claim 40, wherein the code for causing a computer to generate comprises:
   code for causing a computer to identify a common search space and respective UE-specific search spaces associated with respective UEs in the potentially assisted group; and
   code for causing a computer to generate the reduced subset of control decoding candidates at least in part by limiting the respective sets of control decoding candidates for at least one UE in the potentially assisted group to control decoding candidates associated with the common search space or respective UE-specific search spaces for the at least one UE in the potentially assisted group.

46. The computer program product of claim 45, wherein the code for causing a computer to generate further comprises:
   code for causing a computer to identify a level of system loading associated with the potentially assisted group; and
   code for causing a computer to selectively include or omit control decoding candidates associated with the common search space from the reduced subset of control decoding candidates in response to a identified level of system loading associated with the potentially assisted group.

47. The computer program product of claim 40, wherein the code for causing a computer to generate comprises:
   code for causing a computer to identify one or more aggregation levels associated with the respective sets of control decoding candidates; and
   code for causing a computer to generate the reduced subset of control decoding candidates at least in part by limiting the respective sets of control decoding candidates for at least one UE in the potentially assisted group to control decoding candidates associated with one or more selected aggregation levels.

48. The computer program product of claim 40, wherein the code for causing a computer to generate comprises:
   code for causing a computer to identify one or more control channel sizes associated with the respective sets of control decoding candidates; and
   code for causing a computer to generate the reduced subset of control decoding candidates at least in part by limiting the respective sets of control decoding candidates for at least one UE in the potentially assisted group to control decoding candidates associated with a one or more selected control channel sizes.

49. The computer program product of claim 40, wherein the code for causing a computer to generate comprises:
   code for causing a computer to identify a level of system loading associated with the potentially assisted group; and
   code for causing a computer to determine an extent to omit control decoding candidates from the reduced subset of control decoding candidates in response to a identified level of system loading associated with the potentially assisted group.

50. The computer program product of claim 40, wherein the control decoding candidates correspond to respective Physical Downlink Control Channel (PDCCH) blind decodes associated with a cyclic redundancy check (CRC) field of greater than 16 bits.

* * * * *